United States Patent
Yu et al.

(10) Patent No.: US 8,303,709 B2
(45) Date of Patent: Nov. 6, 2012

(54) GYPSUM-CONTAINING PRODUCT

(75) Inventors: Qiang Yu, Grayslake, IL (US); Steven W. Sucech, Lake Villa, IL (US); Brent E. Groza, Grayslake, IL (US); Raymond J. Mlinac, Wildwood, IL (US); Frederick T. Jones, Grayslake, IL (US); Paul J. Henkels, Arlington Heights, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 13/364,275

(22) Filed: Feb. 1, 2012

(65) Prior Publication Data

US 2012/0135179 A1    May 31, 2012

Related U.S. Application Data

(60) Continuation of application No. 13/027,944, filed on Feb. 15, 2011, now Pat. No. 8,142,914, which is a division of application No. 12/797,013, filed on Jun. 9, 2010, now Pat. No. 7,964,034, which is a continuation of application No. 12/190,203, filed on Aug. 12, 2008, now Pat. No. 7,758,980, which is a division of application No. 11/760,886, filed on Jun. 11, 2007, now Pat. No. 7,425,236, which is a continuation of application No. 10/920,687, filed on Aug. 18, 2004, now Pat. No. 7,244,304, which is a continuation of application No. 10/293,739, filed on Nov. 13, 2002, now Pat. No. 6,800,131, which is a division of application No. 09/960,127, filed on Sep. 21, 2001, now abandoned, which is a division of application No. 09/138,355, filed on Aug. 21, 1998, now Pat. No. 6,342,284, which is a continuation-in-part of application No. 08/916,058, filed on Aug. 21, 1997, now abandoned.

(51) Int. Cl.
*C04B 11/00* (2006.01)

(52) U.S. Cl. ........ 106/772; 428/332; 428/703; 428/704; 156/39

(58) Field of Classification Search .................. 106/772; 428/332, 703, 704; 156/39
See application file for complete search history.

(56) References Cited

U.S. PATENT DOCUMENTS 1,500,452 A    7/1924    Haggerty
(Continued)

FOREIGN PATENT DOCUMENTS

CA    716037    8/1965
(Continued)

OTHER PUBLICATIONS

BK Giulini Chemie GmbH & Co. OHG, Business Unit Industry, Brochure including Products and Product Overview, 1997.

(Continued)

*Primary Examiner* — Paul Marcantoni
(74) *Attorney, Agent, or Firm* — Leydig Voit & Mayer, Ltd.; Philip T. Petti; David F. Janci

(57) ABSTRACT

The invention provides a set gypsum-containing product having increased resistance to permanent deformation and a method for preparing it comprising forming a mixture of a calcium sulfate material, water, and an appropriate amount of one or more enhancing materials chosen from condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

23 Claims, 5 Drawing Sheets

U.S. PATENT DOCUMENTS

| | | | |
|---|---|---|---|
| 1,790,220 | A | 1/1931 | Balz et al. |
| 2,113,370 | A | 4/1938 | Dunn et al. |
| 2,216,207 | A | 10/1940 | Menaul |
| 2,346,999 | A | 4/1944 | Sandford et al. |
| 2,985,219 | A | 5/1961 | Summerfield |
| 3,246,063 | A | 4/1966 | Podgurski |
| 3,297,601 | A | 1/1967 | Maynard et al. |
| 3,347,627 | A | 10/1967 | Shen |
| 3,516,882 | A | 6/1970 | Cummisford |
| 3,573,947 | A | 4/1971 | Kincade et al. |
| 3,769,051 | A | 10/1973 | Hardin |
| 3,770,468 | A | 11/1973 | Knauf et al. |
| 3,841,886 | A | 10/1974 | Burr |
| 3,920,465 | A | 11/1975 | Burkard et al. |
| 3,949,047 | A | 4/1976 | Cherdron et al. |
| 4,009,062 | A | 2/1977 | Long |
| 4,043,825 | A | 8/1977 | Muller et al. |
| 4,054,461 | A | 10/1977 | Martin |
| 4,126,599 | A | 11/1978 | Sugahara et al. |
| 4,183,908 | A | 1/1980 | Rolfe |
| 4,613,627 | A | 9/1986 | Sherman et al. |
| 4,676,835 | A | 6/1987 | Green et al. |
| 4,801,470 | A | 1/1989 | Friedman et al. |
| 5,158,612 | A | 10/1992 | Savoly et al. |
| 5,215,632 | A | 6/1993 | Fritts et al. |
| 5,240,639 | A | 8/1993 | Diez et al. |
| 5,246,677 | A | 9/1993 | Moser et al. |
| 5,246,679 | A | 9/1993 | Moser et al. |
| 5,320,677 | A | 6/1994 | Baig |
| 5,395,438 | A | 3/1995 | Baig et al. |
| 5,534,059 | A | 7/1996 | Immordino, Jr. |
| 5,643,510 | A | 7/1997 | Sucech |
| 5,683,635 | A | 11/1997 | Sucech et al. |
| 5,714,001 | A | 2/1998 | Savoly et al. |
| 5,980,628 | A | 11/1999 | Hjelmeland et al. |
| 6,342,284 | B1 | 1/2002 | Yu et al. |
| 6,387,172 | B1 | 5/2002 | Yu et al. |
| 6,409,825 | B1 | 6/2002 | Yu et al. |
| 6,481,171 | B2 | 11/2002 | Yu et al. |
| 6,632,550 | B1 | 10/2003 | Yu et al. |
| 6,800,131 | B2 | 10/2004 | Yu et al. |
| 6,815,049 | B2 | 11/2004 | Veeramasuneni et al. |
| 7,244,304 | B2 | 7/2007 | Yu et al. |
| 7,758,980 | B2 | 7/2010 | Yu et al. |
| 2002/0045074 | A1 | 4/2002 | Yu et al. |
| 2002/0112651 | A1 | 8/2002 | Yu et al. |
| 2003/0100648 | A1 | 5/2003 | Yu et al. |
| 2003/0154888 | A1 | 8/2003 | Yu et al. |
| 2007/0048549 | A1 | 3/2007 | Song et al. |

FOREIGN PATENT DOCUMENTS

| | | | |
|---|---|---|---|
| CN | 1060458 | A | 4/1992 |
| CN | 1067874 | A | 1/1993 |
| EP | 0 001 591 | A1 | 5/1979 |
| EP | 0 681 998 | A1 | 11/1995 |
| JP | 49 025090 | B4 | 6/1974 |
| JP | 53 067720 | A | 6/1978 |
| JP | 53 067770 | A | 6/1978 |
| JP | 53 079924 | A2 | 7/1978 |
| JP | 53 088031 | A | 8/1978 |
| JP | 55-023029 | | 2/1980 |
| JP | 56 152885 | A2 | 11/1981 |
| JP | 06-219811 | | 8/1994 |
| JP | 07 002617 | A2 | 1/1995 |
| JP | 08-333154 | | 12/1996 |
| JP | 09-169014 | | 6/1997 |
| NO | 1999 1885L | A | 6/1999 |
| RU | 1768626 | A1 | 10/1992 |
| SU | 629183 | T | 10/1978 |
| SU | 833521 | B | 5/1981 |
| SU | 1613469 | A | 12/1990 |
| WO | WO 93/02963 | A1 | 2/1993 |
| WO | WO 95/01651 | A1 | 1/1995 |
| WO | WO 99/08979 | | 2/1999 |

OTHER PUBLICATIONS

"Biochemicals and Reagents for Life Science Research," *Sigma-Aldrich Co.*, 824 (1999) (not prior art).

Coughlin et al., "Hydration-Rate Studies of Gypsum Plasters: Effects of Small Amounts of Dissolved Substances," *Report of Investigations 5477*, U.S. Department of the Interior, Bureau of Mines (1959).

Derwent Abstract 78-54041A of JP 53 067720 A, WPI/Derwent Publications, Ltd. (London) (Jun. 16, 1978).

Derwent Abstract 78-64264A of JP 53 088031 A, WPI/Derwent Publications, Ltd. (London) (Aug. 3, 1978).

Derwent Abstract 91-337678 of SU 1 613 469 A, WPI/Derwent Publications, Ltd. (London) (Dec. 15, 1990).

Drywall & Veneer Plaster Construction (Cladding-Curved Surfaces), *Gypsum Construction Handbook—90th Anniversary Edition*, United States Gypsum Company, 182-185 (1992).

Johnson et al., "Progress Report and Progress Report Summary," *United States Gypsum Company Research Laboratories* (Aug. 20, 1955) (not prior art).

Khanush, "Gypsum-Cardboard Plates," *Stroiyizdat*, Moscow (1983) (Excerpts).

Kirk-Othmer, *Encyclopedia of Chemical Technology*, 4, 812-826, 1992.

Ridge et al., "Mechanism of the Retardation of the Set Gypsum Plaster," *Aust. J. Appl. Sci.*, 11 (3), Nov. 7, 1960.

"Sodium Hexametaphosphate (SHMP) Long Chain-Powder," Product Data Sheet, Solutia Inc., St. Louis (1998) (not prior art).

United States Gypsum Company Research Laboratories, *Progress Report and Progress Report Summary*, dated Aug. 20, 1955 (not prior art).

Van Wazer, "Phosphorous and Its Compounds," *Interscience Publishers, Inc.*, 419-421, 679-691 (1958).

Volzhensky, "Mineral Binding Agents," *Stroiyizdat*, Moscow (1986) (Excerpts).

Yamada et al., "Influences of Additives Specially Na Citrate upon the Strength of Set Gypsum," *Gypsum & Lime*, 144, 2-9 (1979).

Zubarev, "Manual of Producing Gypsum and Gypsum Products," *Stroiyizdat*, Moscow (1963) (Excerpts).

Dew Point Induced Ceiling Sag Test Of 1/2" Board of Invention Vs 5/8" Type X

GYPSUM-CONTAINING PRODUCT

This application is a continuation application of co-pending U.S. application Ser. No. 13/027,944, filed on Feb. 15, 2011, which is a divisional application of U.S. application Ser. No. 12/797,013, filed on Jun. 9, 2010, now U.S. Pat. No. 7,964,034, which is a continuation application of U.S. application Ser. No. 12/190,203, filed on Aug. 12, 2008, now U.S. Pat. No. 7,758,980, which is a divisional application of U.S. application Ser. No. 11/760,886, filed on Jun. 11, 2007, now U.S. Pat. No. 7,425,236, which is a continuation application of U.S. application Ser. No. 10/920,687, filed Aug. 18, 2004, now U.S. Pat. No. 7,244,304, which is a continuation application of U.S. application Ser. No. 10/293,739, filed on Nov. 13, 2002, now U.S. Pat. No. 6,800,131, which is a divisional application of U.S. application Ser. No. 09/960,127, filed on Sep. 21, 2001, which is abandoned, which is a divisional application of U.S. application Ser. No. 09/138,355, filed on Aug. 21, 1998, now U.S. Pat. No. 6,342,284, which is a continuation-in-part application of U.S. application Ser. No. 08/916,058, filed Aug. 21, 1997, which is abandoned, all of which preceding applications are hereby incorporated by reference.

FIELD OF THE INVENTION

This invention relates to a method and composition for preparing set gypsum-containing products, e.g., gypsum boards, reinforced gypsum composite boards, plasters, machinable materials, joint treatment materials, and acoustical tiles, and methods and compositions for producing them. More particularly, the invention concerns such set gypsum-containing products that have increased resistance to permanent deformation (e.g., sag resistance) by employing one or more enhancing materials. Some preferred embodiments of the invention concern making such products by hydration of calcined gypsum in the presence of an enhancing material that causes the set gypsum produced by such hydration to have increased strength, resistance to permanent deformation (e.g., sag resistance), and dimensional stability (e.g., non-shrinkage during drying of set gypsum). The enhancing material also provides other improved properties and advantages in preparing the set gypsum-containing products. In an alternative embodiment of the invention, set gypsum is treated with one or more enhancing materials to provide similar, if not the same, increased strength, resistance to permanent deformation (e.g., sag resistance), dimensional stability, and other improved properties and advantages in gypsum-containing products. In some embodiments of the invention the set gypsum-containing product of the invention contains relatively high concentrations of chloride salts, yet avoids detrimental effects of such salt concentrations in gypsum-containing products in general.

BACKGROUND

Many well known useful products contain set gypsum (calcium sulfate dihydrate) as a significant, and often as the major, component. For example, set gypsum is the major component of paper-faced gypsum boards employed in typical drywall construction of interior walls and ceilings of buildings (see, e.g., U.S. Pat. Nos. 4,009,062 and 2,985,219). It is also the major component of gypsum/cellulose fiber composite boards and products, as described in U.S. Pat. No. 5,320,677. Products that fill and smooth the joints between edges of gypsum boards often contain major amounts of gypsum (see, e.g., U.S. Pat. No. 3,297,601). Acoustical tiles useful in suspended ceilings can contain significant percentages of set gypsum, as described, for example, in U.S. Pat. Nos. 5,395,438 and 3,246,063. Traditional plasters in general, e.g., for use to create plaster-surfaced internal building walls, usually depend mainly on the formation of set gypsum. Many specialty materials, such as a material useful for modeling and mold-making that can be precisely machined as described in U.S. Pat. No. 5,534,059, contain major amounts of gypsum.

Most such gypsum-containing products are prepared by forming a mixture of calcined gypsum (calcium sulfate hemihydrate and/or calcium sulfate anhydrite) and water (and other components, as appropriate), casting the mixture into a desired shaped mold or onto a surface, and allowing the mixture to harden to form set (i.e., rehydrated) gypsum by reaction of the calcined gypsum with the water to form a matrix of crystalline hydrated gypsum (calcium sulfate dihydrate). This is often followed by mild heating to drive off the remaining free (unreacted) water to yield a dry product. It is the desired hydration of the calcined gypsum that enables the formation of an interlocking matrix of set gypsum crystals, thus imparting strength to the gypsum structure in the gypsum-containing product.

All of the gypsum-containing products described above could benefit if the strength of their component set gypsum crystal structures were increased in order to make them more resistant to the stresses they may encounter during use.

Also there is a continuing effort to make many such gypsum-containing products lighter in weight by substituting lower density materials (e.g., expanded perlite or air voids) for part of their set gypsum matrix. In such cases there is a need to increase the strength of the set gypsum above normal levels just to maintain overall product strength at the levels of the previously higher density product, because there is less set gypsum mass to provide strength in the lower density product.

Furthermore, there is a need for greater resistance to permanent deformation (e.g., sag resistance) in the structure of many of these gypsum-containing products, especially under conditions of high humidity and temperature, or even load. The human eye typically cannot perceive sag of a gypsum-containing board at less than about 0.1 inch of sag per two foot length of board. Thus, there is a need for gypsum-containing products that are resistant to permanent deformation over the useful life of such products. For example, gypsum-containing boards and tiles are often stored or employed in a manner in which they are positioned horizontally. If the set gypsum matrix in these products is not sufficiently resistant to permanent deformation, especially under high humidity and temperature, or even load, the products may start to sag in areas between the points where they are fastened to or supported by an underlying structure. This can be unsightly and can cause difficulties in use of the products. In many applications gypsum-containing products must be able to carry loads, e.g., insulation or condensation loads, without perceptible sag. Thus, there is a continuing need to be able to form set gypsum having increased resistance to permanent deformation (e.g., sag resistance).

There is also a need for greater dimensional stability of set gypsum in gypsum-containing products during their manufacture, processing, and commercial application. Especially under conditions of changing temperature and humidity, set gypsum can shrink or expand. For example, moisture taken up in crystal interstices of a gypsum matrix of a gypsum board or tile exposed to high humidity and temperature can aggravate a sagging problem by causing the humidified board to expand. Also, in the preparation of set gypsum products there is usually a significant amount of free (unreacted) water left in the matrix after the gypsum has set. This free water is usually subsequently driven off by mild heating. As the evaporating water leaves the crystal interstices of the gypsum matrix, the matrix tends to shrink from natural forces of the set gypsum (i.e., the water was holding apart portions of the interlocking set gypsum crystals in the matrix, which then tend to move closer together as the water evaporates).

If such dimensional instability could be avoided or minimized, various benefits would result. For example, existing gypsum board production methods would yield more product if the boards did not shrink during drying, and gypsum-containing products desired to be relied on to hold a precise shape and dimensional proportions (e.g., for use in modeling and mold making) would serve their purposes better. Also, for example, some plasters intended for interior building wall surfaces could benefit from not shrinking during drying, so that the plaster could be applied in thicker layers without danger of cracking, rather than needing to be applied in multiple thinner layers with long pauses to allow adequate drying between layer applications.

Some particular types of gypsum-containing products also exhibit other particular problems. For example, lower density gypsum-containing products are often produced by using foaming agents to create aqueous bubbles in calcined gypsum slurries (flowable aqueous mixtures) that yield corresponding permanent voids in the product when the set gypsum forms. It is often a problem that, because the aqueous foams employed are inherently unstable and therefore many of the bubbles may coalesce and escape the relatively dilute slurry (like bubbles in a bubble bath) before the set gypsum forms, significant concentrations of foaming agents have to be employed to produce the desired concentration of voids in the set gypsum, in order to obtain a product of desired density. This increases costs and risks of adverse effects of chemical foaming agents on other components or properties of the gypsum-containing products. It would be desirable to be able to reduce the amount of foaming agent needed to produce a desired void concentration in set gypsum-containing products.

There is also a need for new and improved compositions and methods for producing set gypsum-containing products made from mixtures containing high concentrations (i.e., at least 0.015 weight percent, based on the weight of calcium sulfate materials in the mixture) of chloride ions or salts thereof. The chloride ions or salts thereof may be impurities in the calcium sulfate material itself or the water (e.g., sea water or brine-containing subsurface water) employed in the mixture, which prior to the present invention could not be used to make stable set gypsum-containing products.

There is also a need for new and improved compositions and methods for treating set gypsum to improve strength, resistance to permanent deformation (e.g., sag resistance), and dimensional stability.

Thus, there is a continuing need for new and improved set gypsum-containing products, and compositions and methods for producing them, that solve, avoid, or minimize the problems noted above. The present invention meets these needs.

SUMMARY OF THE INVENTION

The present inventors have unexpectedly found set gypsum-containing products and compositions and methods for their preparation that unexpectedly meet the needs described above. Each embodiment of the invention meets one or more of these needs.

A set gypsum-containing product of the invention having increased resistance to permanent deformation is prepared in accordance with the invention by forming a mixture of a calcium sulfate material, water, and an appropriate amount of one or more enhancing materials chosen from: condensed phosphoric acids, each of which comprises 2 or more phosphoric acid units; and salts or ions of condensed phosphates, each of which comprises 2 or more phosphate units.

The mixture is then maintained under conditions sufficient for the calcium sulfate material to form the improved set gypsum material.

As used herein, the term, "calcium sulfate material", is intended to mean calcium sulfate anhydrite; calcium sulfate hemihydrate; calcium sulfate dihydrate; ions of calcium and sulfate; or mixtures of any or all thereof.

In some embodiments of the invention the calcium sulfate material is mostly calcium sulfate hemihydrate. In such cases all of the enhancing materials described above will impart increased resistance to permanent deformation to the set gypsum formed. However, some enhancing materials (e.g., the following salts, or the anionic portions thereof: sodium trimetaphosphate (also referred to herein as STMP), sodium hexametaphosphate having 6-27 repeating phosphate units (also referred to herein as SHMP), and ammonium polyphosphate having 1000-3000 repeating phosphate units (also referred to herein as APP)) will provide preferred benefits, such as greater increase in sag resistance. Also, APP provides equal sag resistance to that provided by STMP, even when added in only one fourth the STMP concentration.

In some preferred embodiments of the present invention, this is accomplished by adding trimetaphosphate ion to a mixture of calcined gypsum and water to be used to produce set gypsum-containing products (as used herein, the term, "calcined gypsum", is intended to mean alpha calcium sulfate hemihydrate, beta calcium sulfate hemihydrate, water-soluble calcium sulfate anhydrite, or mixtures of any or all thereof, and the terms, "set gypsum" and "hydrated gypsum", are intended to mean calcium sulfate dihydrate). When the water in the mixture reacts spontaneously with the calcined gypsum to form set gypsum, the set gypsum is unexpectedly found to have increased strength, resistance to permanent deformation (e.g., sag resistance), and dimensional stability, compared with set gypsum formed from a mixture containing no trimetaphosphate ion. The mechanism for these improvements in properties is not understood.

Furthermore, it has been unexpectedly found that trimetaphosphate ion (like APP) does not retard the rate of the formation of set gypsum from calcined gypsum. In fact, when added at relatively higher concentration levels within its useful ranges of addition, trimetaphosphate ion actually accelerates the rate of hydration of calcined gypsum to form set gypsum. This is especially surprising, as is the increase in the strength of the set gypsum, because it has been generally thought in the gypsum art that phosphoric or phosphate materials retard the rate of formation of set gypsum and decrease the strength of the gypsum formed. This is in fact true for most such materials, but not for trimetaphosphate ion.

Thus, in general, some preferred embodiments of the invention provide a method for producing a set gypsum-containing product having increased strength, resistance to permanent deformation (e.g., sag resistance), and dimensional stability, comprising: forming a mixture of calcined gypsum, water, and trimetaphosphate ion, and maintaining the mixture under conditions (e.g., a temperature preferably less than about 120 F) sufficient for the calcined gypsum to convert to set gypsum.

In some preferred embodiments of the invention the method is one of producing a gypsum board comprising a core of set gypsum sandwiched between cover sheets of paper or other material. The board is prepared by forming a flowable mixture (slurry) of calcined gypsum, water, and trimetaphosphate ion, depositing it between cover sheets, and allowing the resultant assembly to set and dry.

While the board thus produced has all of the desired improved properties of increased strength, resistance to permanent deformation (e.g., sag resistance), and dimensional stability, it has been observed that, for reasons unknown, when such a board has for some reason become wet or has not been completely dried during production, the bond between the gypsum core and the cover sheets (usually comprising paper) can lose strength or even fail, even when the board contains a typical nonpregelatinized starch (e.g., an acid-modified starch) which normally contributes to better paper-to-core bond integrity. The cover sheets could then delaminate from the board, which would be unacceptable. Fortunately the present inventors have also found a solution to this possible attendant problem. They have found that the problem can be avoided by including a pregelatinized starch in the production slurry. This starch then becomes distributed throughout the resultant gypsum core, and it has been unexpectedly found that this avoids the weakening of the bonding between the core and the cover sheets.

Thus, in some of its embodiments the invention provides a composition and method for producing an even more improved gypsum board. The composition comprises a mixture of water, calcined gypsum, trimetaphosphate ion, and a pregelatinized starch. The method comprises forming such a mixture, depositing it between cover sheets and allowing the resultant assembly to set and dry.

In cases where it is desired to produce a gypsum board of lighter weight, the invention provides a composition and method for accomplishing this. The composition comprises a mixture of water, calcined gypsum, trimetaphosphate ion, and an aqueous foam, and the method comprises forming such a mixture, depositing it between cover sheets, and allowing the resultant assembly to set and dry. Such composition and method provide a board of lighter weight, because the bubbles of aqueous foam result in corresponding air voids in the set gypsum core of the resultant board. The overall strength of the board is higher than a prior art board produced with the inclusion of an aqueous foam in the mixture, because of the increased strength provided by the inclusion of the trimetaphosphate ion in the mixture used to form the inventive board. For example, ceiling boards of ½ inch thickness made in accordance with the present invention have greater resistance to permanent deformation (e.g., sag resistance) than ⅝ inch ceiling boards made using prior art compositions and methods. Thus, the present invention provides substantial cost savings for ceiling board production. Unexpectedly, there has been found to be another benefit to the inclusion of trimetaphosphate ion in mixtures also containing an aqueous foam. Namely, it has been found that proportionally more air voids (and more overall air void volume) per unit amount of aqueous foam employed, are created in the resultant gypsum-containing product when trimetaphosphate ion is included in the mixture. The reason for this is not known, but the beneficial result is that less foaming agent has to be employed to produce the desired amount of air void volume in the set gypsum-containing product. This in turn results in lower production costs and less risk of adverse effects of chemical foaming agents on other components or properties of the gypsum-containing product.

In some embodiments the invention provides a composite board comprising set gypsum and a reinforcing material, prepared by: forming or depositing a mixture on a surface, wherein the mixture comprises the reinforcing material, a calcium sulfate material, water, and an appropriate amount of one or more enhancing materials chosen from condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The invention also provides a composite board comprising set gypsum and host particles, at least a portion of the set gypsum being positioned in and about accessible voids in the host particles. The board is prepared by forming or depositing a mixture on a surface, wherein the mixture comprises: the host particles; calcium sulfate hemihydrate, at least a portion of which is in the form of crystals in and about the voids of the host particles; water; and an appropriate amount of one or more enhancing materials chosen from the group consisting of condensed phosphoric acids, each of which comprises 2 or more phosphoric acid units; and salts or ions of condensed phosphates, each of which comprises 2 or more phosphate units. The mixture is then maintained under conditions sufficient for the calcium sulfate hemihydrate to form set gypsum, whereby the portion of the set gypsum in and about the accessible voids in the host particles forms by in situ hydration of the calcium sulfate hemihydrate crystals in and about the voids of the host particles.

The invention also provides a set gypsum-containing machinable product prepared by forming a mixture comprising a starch, particles of a water-redispersible polymer, a calcium sulfate material, water, and an appropriate amount of one or more enhancing materials chosen from: condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The invention also provides a set gypsum-containing product employed to finish a joint between edges of gypsum boards, the product prepared by inserting into the joint a mixture comprising a binder, a thickener, a non-leveling agent, a calcium sulfate material, water, and an appropriate amount of one or more enhancing materials chosen from condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The invention also provides a set gypsum-containing acoustical tile prepared by forming or depositing in a tray a mixture comprising a gelatinized starch, a mineral wool, a calcium sulfate material, water, and an appropriate amount of one or more enhancing materials chosen from condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The invention also provides another type of set gypsum-containing acoustical tile prepared by forming or depositing in a tray a mixture comprising a gelatinized starch, expanded perlite particles, a fiber reinforcing agent, a calcium sulfate material, water, and an appropriate amount of one or more enhancing materials chosen from condensed phosphoric acids, each of which comprises 2 or more phosphoric acid units; and salts or ions of condensed phosphates, each of which comprises 2 or more phosphate units. The mixture is then maintained under conditions sufficient for the calcium sulfate material to form a set gypsum material.

The invention also provides set gypsum-containing products made by forming a mixture of enhancing material, calcium sulfate dihydrate and water. More specifically, these embodiments involve the treatment of gypsum cast with enhancing material. Formation of a mixture of the enhancing material, water, and calcium sulfate dihydrate has been found to provide set gypsum-containing products having increased strength, resistance to permanent deformation (i.e., sag resistance), and dimensional stability. Such post set treatment can be accomplished by addition of the enhancing material by either spraying or soaking the calcium sulfate dihydrate cast with the enhancing material.

In some embodiments the invention provides a composition and method for producing set gypsum-containing products from mixtures containing high concentrations of chloride ions or salts thereof (i.e., at least 0.015 weight percent, based on the weight of calcium sulfate materials in the mixture). The chloride ions or salts thereof may be impurities in the calcium sulfate material itself or the water (e.g., sea water or brine-containing subsurface water) employed in the mixture, which prior to the present invention could not be used to make stable set gypsum-containing products.

DESCRIPTION OF PREFERRED EMBODIMENTS

Figure 1:
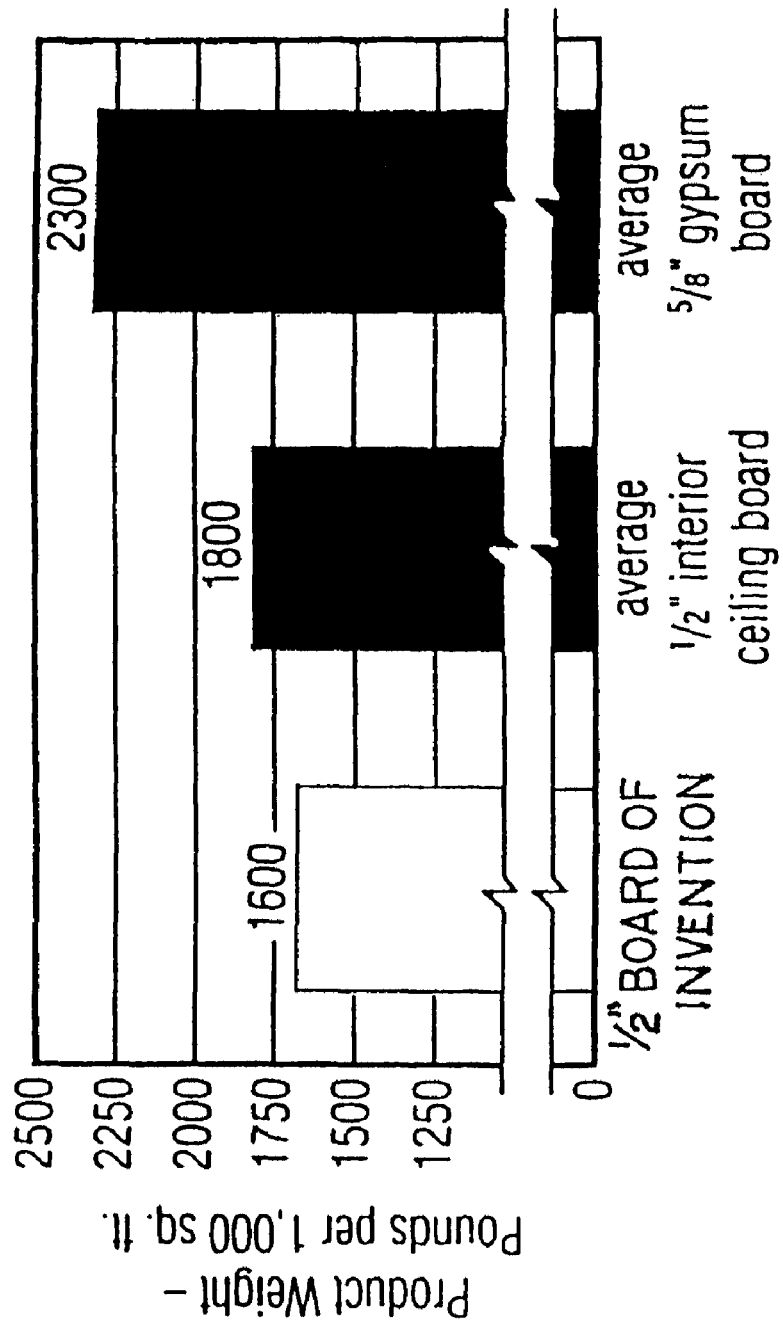
FIG. 1 is a graph depicting product weight of gypsum board products, including the gypsum board of the present invention.

The present invention can be practiced employing compositions and methods similar to those employed in the prior art to prepare various set gypsum-containing products. The essential difference in the compositions and methods of some preferred embodiments of this invention from compositions and methods employed in the prior art to prepare various set gypsum-containing products is that a trimetaphosphate salt is included to provide that in methods of the invention the rehydration of calcined gypsum to form set gypsum takes place in the presence of trimetaphosphate ion and thereby produces the benefits of the invention. In other respects the compositions and methods of the invention can be the same as the corresponding compositions and methods of the prior art.

The trimetaphosphate salt included in compositions of the invention can comprise any water-soluble trimetaphosphate salt that does not adversely interact with other components of the composition. Some examples of useful salts are sodium trimetaphosphate, potassium trimetaphosphate, ammonium trimetaphosphate, lithium trimetaphosphate, aluminum trimetaphosphate, and mixed salts thereof, among others. Sodium trimetaphosphate is preferred. It is readily commercially available, for example, from Solutia Inc. of St. Louis, Mo., previously a unit of Monsanto Company of St. Louis, Mo.

To be used in the practice of one of the preferred methods of the invention, the trimetaphosphate salt is dissolved in the aqueous mixture of calcined gypsum to yield a trimetaphosphate ion concentration of from about 0.004 to about 2.0 percent by weight, based on the weight of the calcined gypsum. A preferred concentration of trimetaphosphate ion is from about 0.04 to about 0.16 percent. A more preferred concentration is about 0.08 percent. If desired for easier storage and delivery in the practice of some embodiments of the invention, the trimetaphosphate salt can be predissolved in water and inserted into the mixture in the form of an aqueous solution.

In accordance with a preferred embodiment of the invention, the trimetaphosphate ion need only be present in the aqueous mixture of calcined gypsum during the hydration of the calcined gypsum to form set gypsum. Therefore, while it is usually most convenient and thus preferred to insert the trimetaphosphate ion into the mixture at an early stage, it is also sufficient to insert the trimetaphosphate ion into the mixture of calcined gypsum and water at a somewhat later stage. For example, in preparing typical gypsum boards, water and calcined gypsum are brought together in a mixing apparatus, are mixed thoroughly, and then are usually deposited onto a cover sheet on a moving belt, and a second cover sheet is placed over the deposited mixture before the major part of the rehydration of calcined gypsum to form set gypsum occurs. While it is most convenient to get the trimetaphosphate ion into the mixture during its preparation in the mixing apparatus, it is also sufficient to add the trimetaphosphate ion at a later stage, e.g., by spraying an aqueous solution of the ion onto the deposited aqueous mixture of calcined gypsum just before the second cover sheet is placed over the deposit, so that the aqueous trimetaphosphate ion solution will soak into the deposited mixture and be present when the bulk of the hydration to form set gypsum occurs.

Other alternative methods of getting the trimetaphosphate ion into the mixture will be apparent to those of ordinary skill in the art and are of course considered to be within the scope of the present invention. For example, it may be possible to pre-coat one or both of the cover sheets with a trimetaphosphate salt, so that the salt will dissolve and cause trimetaphosphate ion to migrate through the mixture when the deposit of the aqueous mixture of calcined gypsum comes into contact with the cover sheet. Another alternative is to mix a trimetaphosphate salt with raw gypsum even before it is heated to form calcined gypsum, so that the salt is already present when the calcined gypsum is mixed with water to cause rehydration.

Other alternative methods of getting the trimetaphosphate ion into the mixture are to add the trimetaphosphate ion to the set gypsum by any suitable means, such as spraying or soaking the set gypsum with a solution containing trimetaphosphate. It has been found that the trimetaphosphate ion will migrate to the set gypsum through conventional paper sheets used in the processing of set gypsum.

The calcined gypsum employed in the invention can be in the form and concentrations typically found useful in the corresponding embodiments of the prior art. It can be alpha calcium sulfate hemihydrate, beta calcium sulfate hemihydrate, water-soluble calcium sulfate anhydrite, or mixtures of any or all thereof, from natural or synthetic sources. In some preferred embodiments alpha calcium sulfate hemihydrate is employed for its yield of set gypsum having relatively high strength. In other preferred embodiments beta calcium sulfate hemihydrate or a mixture of beta calcium sulfate hemihydrate and water-soluble calcium sulfate anhydrite are employed.

Other conventional additives can be employed in the practice of the invention in customary amounts to impart desirable properties and to facilitate manufacturing, such as, for example, aqueous foam, set accelerators, set retarders, recalcination inhibitors, binders, adhesives, dispersing aids, leveling or nonleveling agents, thickeners, bactericides, fungicides, pH adjusters, colorants, reinforcing materials, fire retardants, water repellants, fillers and mixtures thereof.

In some preferred inventive embodiments wherein the method and composition are for preparing gypsum board comprising a core of set gypsum-containing material sandwiched between cover sheets, trimetaphosphate ion is employed in the concentrations and manner described above. In other respects, the composition and method can be practiced with the same components and in the same manner as the corresponding compositions and methods for preparing gypsum board of the prior art, for example, as described in U.S. Pat. Nos. 4,009,062 and 2,985,219, the disclosures of which are incorporated herein by reference. Boards produced using this preferred inventive composition and method exhibit improved strength, resistance to permanent deformation, and dimensional stability.

In preferred methods and compositions for preparing gypsum board, wherein the surface sheets of the board comprise paper, a pregelatinized starch is also employed to avoid the otherwise slightly increased risk of paper delamination under conditions of extreme moisture. Pregelatinizing of raw starch is achieved by cooking in water at temperatures of at least 185 F or by other well known methods.

Some examples of readily available pregelatinized starches that serve the purposes of the present invention are (identified by their commercial names): PCF1000 starch, available from Lauhoff Grain Co.; and AMERIKOR 818 and HQM PRE-GEL starches, both available from Archer Daniels Midland Co.

To be used in a preferred practice of the invention, the pregelatinized starch is included in the aqueous mixture of calcined gypsum at a concentration of from about 0.08 to about 0.5 percent by weight, based on the weight of the calcined gypsum. A preferred concentration of pregelatinized starch is from about 0.16 to about 0.4 percent. A more preferred concentration is about 0.3 percent. If the corresponding embodiment of the prior art also contains a starch that has not been pregelatinized (as many do), the pregelatinized starch in the inventive embodiment can also serve to replace all or a portion of the amount of that prior art starch normally employed.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g., from GEO Specialty Chemicals in Ambler, Pa. For further descriptions of useful foaming agents, see, for example: U.S. Pat. Nos. 4,676,835; 5,158,612; 5,240,639 and 5,643,510; and PCT International Application Publication WO 95/16515, published Jun. 22, 1995.

In many cases it will be preferred to form relatively large voids in the gypsum product, in order to help maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing foamed gypsum product. However, it is preferable to blend such foaming agents concurrently and continuously, as an integral "on-line" part of the process. This can be accomplished, for example, by pumping separate streams of the different foaming agents and bringing the streams together at, or just prior to, the foam generator that is employed to generate the stream of aqueous foam which is then inserted into and mixed with the calcined gypsum slurry. By blending in this manner, the ratio of foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. No. 5,643,510, and in copending U.S. patent application Ser. No. 08/577,367, filed Dec. 22, 1995.

An example of one type of foaming agent, useful to generate unstable foams, has the formula $$ROSO_3^{\ominus}M^{\oplus} \tag{Q}$$

wherein R is an alkyl group containing from 2 to 20 carbon atoms, and M is a cation. Preferably, R is an alkyl group containing from 8 to 12 carbon atoms.

An example of one type of foaming agent, useful to generate stable foams, has the formula $$CH_3(CH_2)_xCH_2(OCH_2CH_2)_Y(OSO_3^{\ominus}M^{\oplus}) \tag{J}$$

wherein X is a number from 2 to 20, Y is a number from 0 to 10 and is greater than 0 in at least 50 weight percent of the foaming agent, and M is a cation.

In some preferred embodiments of the invention, foaming agents having the formulas (Q) and (J) above are blended together, such that the formula (Q) foaming agent and the portion of the formula (J) foaming agent wherein Y is 0, together constitute from 86 to 99 weight percent of the resultant blend of foaming agents.

In some preferred embodiments of the invention, the aqueous foam has been generated from a pre-blended foaming agent having the formula $$CH_3(CH_2)_xCH_2(OCH_2CH_2)_YOSO_3^{\ominus}M^{\oplus} \tag{Z}$$

wherein X is a number from 2 to 20, Y is a number from 0 to 10 and is 0 in at least 50 weight percent of the foaming agent, and M is a cation. Preferably, Y is 0 in from 86 to 99 weight percent of the formula (Z) foaming agent.

In some preferred inventive embodiments wherein the method and composition are for preparing a composite board comprising set gypsum and particles of a reinforcing material, trimetaphosphate ion is employed in the concentrations and manner described above. It is particularly preferred that the composite product comprise set gypsum and host particles, at least a portion of the set gypsum being positioned in and about accessible voids in the host particles. The inventive composition comprises a mixture of: host particles having accessible voids therein; calcined gypsum, at least a portion of which is in the form of crystals in and about the voids in the host particles; and a water-soluble trimetaphosphate salt. The composition can be mixed with water to produce an inventive mixture of water, host particles having accessible voids therein, calcined gypsum (at least a portion of which is in the form of crystals in and about the voids in the host particles), and trimetaphosphate ion. The method comprises forming such a mixture, depositing it on a surface or into a mold, and allowing it to set and dry. In other respects, the composition and method can be practiced with the same components and in the same manner as the corresponding compositions and methods for preparing composite board of the prior art, for example, as described in U.S. Pat. No. 5,320,677, the disclosure of which is incorporated herein by reference.

In some preferred inventive embodiments wherein the method and composition are for preparing a machinable material, trimetaphosphate ion is employed in the concentrations and manner described above. In some preferred forms of such embodiments the composition comprises a mixture of calcined gypsum, a water-soluble trimetaphosphate salt, a starch, and particles of a water-redispersible polymer. The composition can be mixed with water to produce an inventive mixture of water, calcined gypsum, trimetaphosphate ion, starch, and particles of water-redispersible polymer. The method comprises forming such a mixture, depositing it on a surface or into a mold, and allowing it to set and dry. In respect to aspects other than the inclusion of trimetaphosphate salts and ions, the composition and method can be practiced with the same components and in the same manner as the corresponding compositions and methods for preparing machinable plaster material of the prior art, for example, as described in U.S. Pat. No. 5,534,059, the disclosure of which is incorporated herein by reference.

In some preferred inventive embodiments wherein the method and composition are for producing a material employed to finish a joint between edges of gypsum boards, trimetaphosphate salt or ion is employed in the concentrations described above. In respect to aspects other than the inclusion of trimetaphosphate salts and ions, the composition and method can be practiced with the same components and in the same manner as the corresponding compositions and methods for producing a joint finishing material in the prior art, for example, as described in U.S. Pat. No. 3,297,601, the disclosure of which is incorporated herein by reference. In some preferred forms of such embodiments the composition comprises a mixture of calcined gypsum, a water-soluble trimetaphosphate salt, a binder, a thickener, and a non-leveling agent. The composition can be mixed with water to produce an inventive mixture of calcined gypsum, trimetaphosphate ion, binder, thickener, and non-leveling agent. The method comprises forming such a mixture, inserting it into a joint between edges of gypsum boards, and allowing it to set and dry.

In such preferred joint finishing embodiments the binder, thickener, and non-leveling agent are chosen from the components well known to those skilled in the joint compound art. For example, the binder can be a conventional latex binder, with poly(vinyl acetate) and poly(ethylene-co-vinyl acetate) being preferred and being included in a range of from about 1 to about 15 percent by weight of the composition. An example of a useful thickener is a cellulosic thickener, e.g., ethylhydroxy ethylcellulose, hydroxypropyl methylcellulose, methylhydroxypropyl cellulose, or hydroxyethyl cellulose, included in a range of from about 0.1 to about 2 percent by weight of the composition. Examples of suitable non-leveling agents are attapulgite, sepiolite, bentonite, and montmorillonite clays, included in a range of from about 1 to about 10 percent by weight of the composition.

In some preferred inventive embodiments wherein the method and composition are for preparing an acoustical tile, trimetaphosphate ion is included in the concentrations described above. In some preferred forms of such embodiments the composition comprises a mixture of water, calcined gypsum, trimetaphosphate ion, a gelatinized starch, and mineral wool or a mixture of water, calcined gypsum, trimetaphosphate ion, a gelatinized starch, expanded perlite particles, and a fiber reinforcing agent. The method comprises forming such a mixture, casting it into a tray, and allowing it to set and dry. In respect to aspects other than the inclusion of trimetaphosphate ion, the composition and method can be practiced with the same components and in the same manner as the corresponding compositions and methods for producing an acoustical tile of the prior art, for example, as described in U.S. Pat. Nos. 5,395,438 and 3,246,063, the disclosures of which are incorporated herein by reference.

The following examples are presented to further illustrate some preferred embodiments of the invention and to compare them with methods and compositions outside the scope of the invention. Unless otherwise indicated, concentrations of materials in compositions and mixtures are given in percent by weight based upon the weight of calcined gypsum present. The abbreviation, "STMP", stands for sodium trimetaphosphate, and the abbreviation, "TMP", stands for trimetaphosphate.

Example 1

Laboratory Cube Compressive Strength

Samples of gypsum-containing products were prepared in accordance with the invention and compared, in regard to compressive strength, with samples prepared using different methods and compositions. The test procedure employed was in accordance with ASTM C472-93.

Samples were prepared by dry blending: 500 g of beta calcium sulfate hemihydrate; 0.6 g of a set accelerator referred to as CSA (Climate Stable Accelerator) commercially available from United States Gypsum Company and comprising fine ground particles of calcium sulfate dihydrate coated to maintain efficiency; and 0 g additive (control samples), 0.5-2 g of STMP (preferred inventive samples), or 0.5-2 g of other phosphate additives (comparative samples). The samples were then mixed with 700 ml tap water having a temperature of 70 F in a 2 liter WARING blender, allowed to soak for 5 seconds and mixed at low speed for 10 seconds. The slurries thus formed were cast into molds to prepare cubes (2 inches per side). After the calcium sulfate hemihydrate set to form gypsum (calcium sulfate dihydrate), the cubes were removed from the molds and dried in a ventilated oven at 112 F for at least 72 hours or until their weight stopped changing. The dried cubes had a density of about 44 pounds per cubic foot (pcf).

Each dry cube's compressive strength was measured on a SATEC testing machine. Results are reported in TABLE 1, below, as average values of three tested samples. Strength values for control samples varied, because various sources of beta calcium sulfate hemihydrate and/or different batches of beta calcium sulfate hemihydrate were employed. Results in the table are reported in the form of the measured compressive strength in pounds per square inch (psi) and percent change in strength over the relevant control (% Δ). Measured values are estimated to have an experimental error of about +/−5% (thus, a reported strength increase over the control of 10% may have actually been anywhere in the range of 5-15%).

TABLE 1

Compressive Strength

| Additive | 0% additive (psi) | 0.1% additive (psi; % Δ) | 0.2% additive (psi; % Δ) | 0.4% additive (psi; % Δ) | 0.8% additive (psi; % Δ) |
|---|---|---|---|---|---|
| STMP | 987 | 1054; 6.8 | 1075; 8.9 | 1072; 8.6 | — |
| STMP | 724 | 843; 16.4 | 957; 32.2 | 865; 19.5 | 783; 8.1 |
| STMP | 742 | 819; 10.4 | 850; 14.6 | — | — |
| STMP | 714 | 800; 12.0 | 834; 16.8 | — | — |
| STMP | 842 | 985; 17.0 | 1005; 19.4 | 1053; 25.1 | 611; −27.4 |
| STMP | 682 | 803; 17.7 | 826; 21.1 | 887; 30.1 | — |
| sodium phosphate | 950 | 951; 0.1 | 929; −2.2 | — | — |
| sodium tripolyphosphate | 950 | 993; 4.5 | 873; −8.1 | — | — |
| sodium hexametaphosphate | 950 | 845; −11.1 | 552; −41.9 | — | — |
| dicalcium phosphate | 763 | 769; 0.8 | 775; 1.6 | 761; −0.3 | — |
| disodium phosphate | 763 | 757; −0.8 | 728; −4.6 | 700; −8.3 | — |
| monocalcium phosphate monohydrate | 763 | 786; 3.0 | 766; 0.4 | 824; 8.0 | — |

The data in TABLE 1 illustrate that the inventive samples (STMP) generally exhibited significantly increased strength over the controls, while the comparative samples generally showed very little or no strength increase or even a significant strength decrease.

Example 2

Resistance to Permanent Deformation

Laboratory Gypsum Board Sag Resistance

Samples of gypsum-containing boards were prepared in a laboratory in accordance with the invention and compared, in regard to resistance to permanent deformation, with sample boards prepared using methods and compositions outside the scope of the invention.

Samples were prepared by mixing in a 5 liter WARING blender for 10 seconds at low speed: 1.5 kg of beta calcium sulfate hemihydrate; 2 g of CSA set accelerator; 2 liters of tap water; and 0 g additive (control samples), 3 g of STMP (inventive samples), or 3 g of other additives (comparative samples). The slurries thus formed were cast into trays to prepare flat gypsum board samples, each having dimensions of about 6×24×½ inches. After the calcium sulfate hemihydrate set to form gypsum (calcium sulfate dihydrate), the boards were dried in a 112 F oven until their weight stopped changing. The final measured weight of each board was recorded. No paper facing was applied to these boards, in order to avoid the effect of paper covers on the gypsum boards' sag performance under humidified conditions.

Each dried board was then laid in a horizontal position upon two ½-inch-wide supports whose length extended the full width of the board, with one support at each end of the board. The boards remained in this position for a specified period of time (in this example, 4 days) under continuous surrounding conditions of 90 F temperature and 90 percent relative humidity. The extent of sag of the board was then determined by measuring the distance (in inches) of the center of the top surface of the board from the imaginary horizontal plane extending between the top edges of the ends of the board. The resistance to permanent deformation of the set gypsum matrix of the board is considered to be inversely proportional to the extent of the sag of the board. Thus, the greater the extent of the sag is, the lower is the relative resistance to permanent deformation of the set gypsum matrix comprising the board.

The tests of resistance to permanent deformation are reported in TABLE 2, including the composition and concentration (weight percent based on the weight of calcium sulfate hemihydrate) of the additive, the final weight of the board, and the extent of measured sag. The additives employed in the comparative samples (outside the scope of the invention) are representative of other materials that have been employed to attempt to improve resistance of gypsum board to sagging under conditions of high humidity.

TABLE 2

Extent of Gypsum Board Sag

| Additive | Additive (weight %) | Board Weight (g) | Board Sag (inches) |
|---|---|---|---|
| none (control) | 0 | 830 | 0.519 |
| STMP | 0.2 | 838 | 0.015 |
| boric acid | 0.2 | 829 | 0.160 |
| sodium aluminum phosphate | 0.2 | 835 | 0.550 |
| wax emulsion | 7.5 | 718 | 0.411 |
| glass fiber | 0.2 | 838 | 0.549 |
| glass fiber + boric acid | 0.2 + 0.2 | 825 | 0.161 |

The data in TABLE 2 illustrate that the board (STMP) prepared in accordance with the invention was much more resistant to sag (and thus much more resistant to permanent deformation) than the control board and the noninventive comparative boards. Moreover, the board prepared in accordance with the invention had sag that was much less than 0.1 inch of sag per two foot length of board, and thus not perceptible to the human eye.

Example 3

Resistance to Permanent Deformation

Production Line Gypsum Board Sag Resistance

Figure 2:
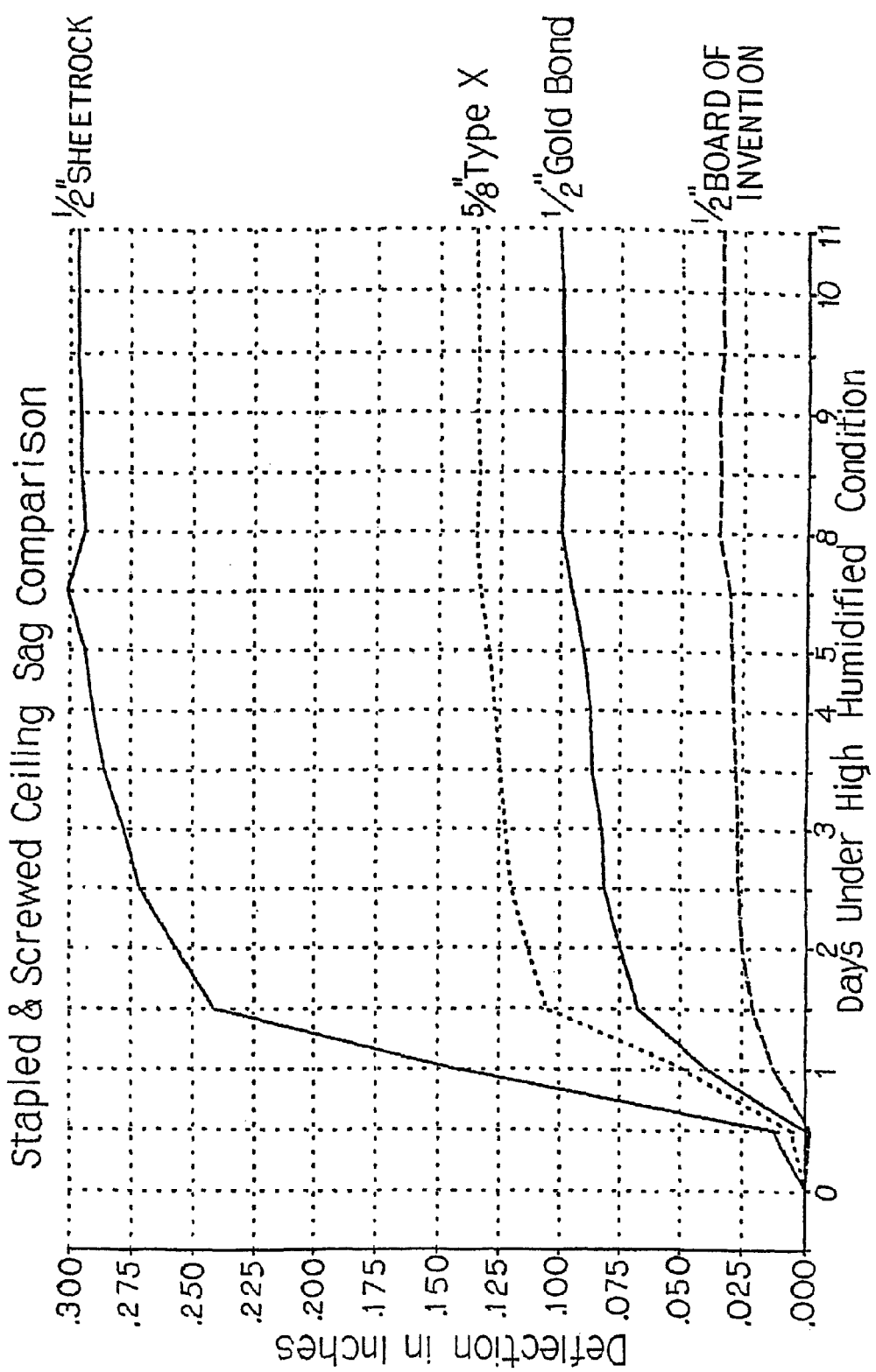
FIG. 2 is a graph comparing sag resistance of a gypsum board made in accordance with the present invention with commercially available gypsum boards, wherein all the tested boards are installed using conventional stapled and screwed ceiling attachment.
Figure 3:
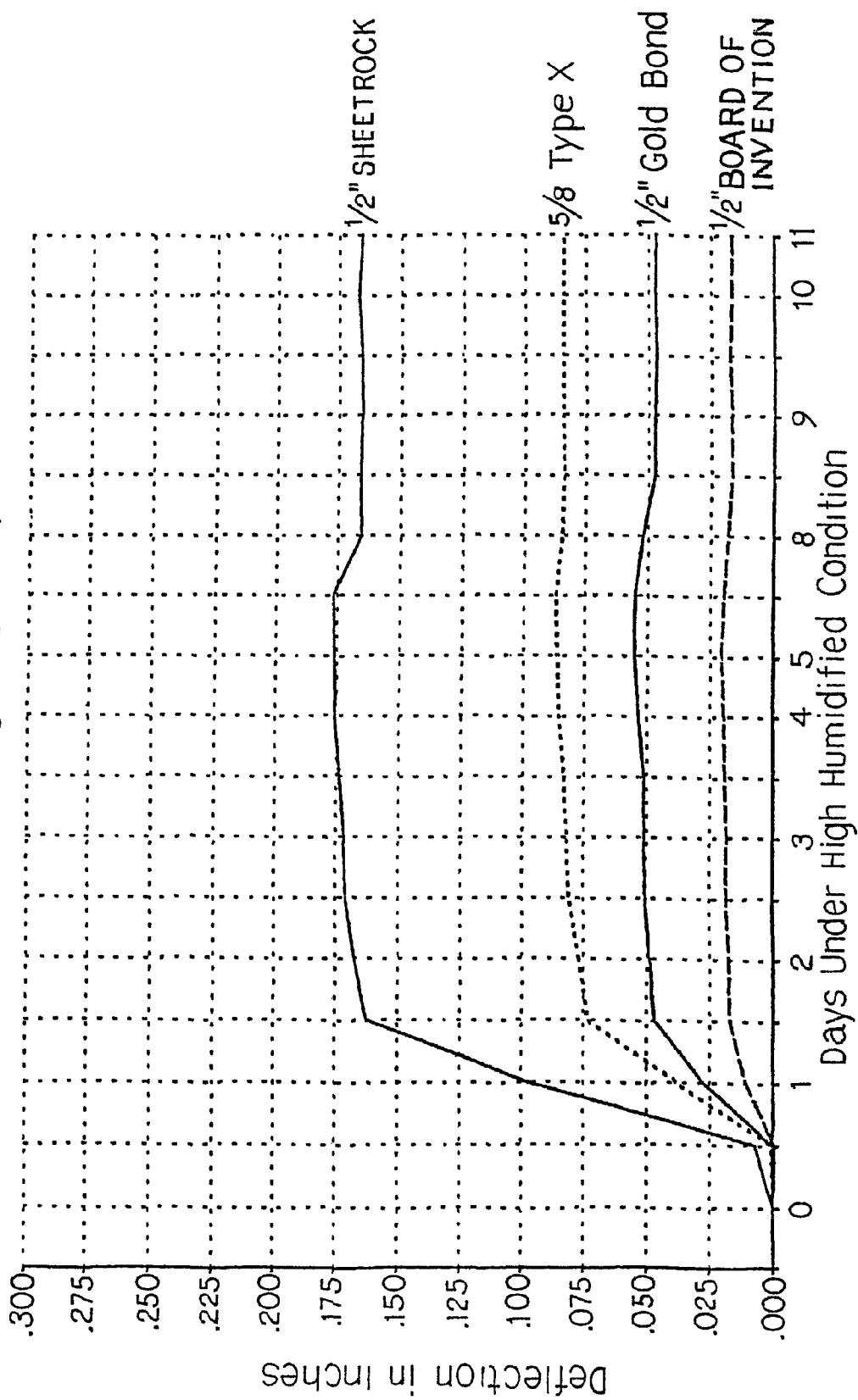
FIG. 3 is a graph comparing sag resistance of a gypsum board made in accordance with the present invention with commercially available gypsum boards, wherein all the tested boards are installed using conventional F2100 ceiling attachment (i.e., adhesive).

A product weight comparison is shown in FIG. 1, and the sag resistance of such products is shown in FIGS. 2 and 3. The product weight of interior ½ inch ceiling board in accordance with the present invention (i.e., admixing trimetaphosphate with calcined gypsum and water) has the same weight as interior ½ inch SHEETROCK® regular gypsum board made by United States Gypsum Company. The average ½ inch interior ceiling board shown in FIG. 1 is Gold Bond® High Strength Ceiling Board made by National Gypsum Company. The average ⅝ inch gypsum board shown in FIG. 1 is SHEETROCK® ⅝ inch Firecode Type X gypsum board made by United States Gypsum Company.

FIG. 2 is a graph comparing sag resistance of a gypsum board made in accordance with the present invention with commercially available gypsum boards described above, wherein all the tested boards are installed using conventional stapled and screwed ceiling attachment.

FIG. 3 is a graph comparing sag resistance of a gypsum board made in accordance with the present invention with commercially available gypsum boards described above, wherein all the tested boards are installed using conventional F2100 Two-Part Urethane Adhesive ceiling attachment.

The gypsum boards and other construction details to make the ceilings used in the sag comparisons depicted in FIGS. 2 and 3 were as follows:

A. Gypsum Board—
1. ½ inch×48 inch×96 inch made in accordance with the present invention.
2. ½ inch×48 inch×96 inch National Gypsum Company Gold Bond® High Strength Ceiling Board.
3. ½ inch×48 inch×96 inch regular SHEETROCK® gypsum board made by United States Gypsum Company.
4. ⅝ inch×48 inch×96 inch SHEETROCK®Firecode Type X gypsum board made by United States Gypsum Company.

B. Trusses—18 inch tall×102 inch long manufactured from nominal 2 inch×3 inch lumber by R.J. Cole, Inc. Joint Compound—USG Tuff Set HES Joint Compound. Joint Tape—USG Fiberglass Mesh Self-Adhering Joint Tape.

C. Vapor Barrier Paint—#4512 Silver Vapor Barrier, item: 246900.

D. Insulation—Delta Blowing Insulation blowing wool, Rockwool mineral fiber.

E. Spray Texture—USG SHEETROCK® Ceiling Spray Texture Q T medium poly.

F. Fasteners—1 inch c.×1¼ inch Ig.×Ga. staples, and #6×1¼ Ig. drywall screws. F2100 Two-part Urethane Adhesive from Foamseal, Inc.

Ceiling Construction

A. 2×4 s were attached at both ends of the trusses to make a truss framework.
B. Twelve (12) sheets of gypsum boards were attached to the truss framework with F2100 adhesive. An average bead width of 1 inch was measured on the gypsum boards.
C. The ceiling was carefully raised and placed on top of four walls previously constructed, to form an 8 foot×48 foot room.
D. The ceiling assembly was attached to the top plate of the walls with #8×3½ inch screws around the perimeter. A second ceiling was built using screws and staples to attach the gypsum boards to the trusses. It was also raised up and attached to four (4) walls.

Two (2) ceilings were built using three (3) sheets of each gypsum type board in each ceiling. The one ceiling was mechanically fastened (see FIG. 2), while the other was fastened with F2100 urethane adhesive only (see FIG. 3). The gypsum boards were laid out, alternating gypsum board types, along the ceilings. The trusses used were 8 foot 5 inch long by 18 inch tall and were spaced at 24 inch on center ("o.c.").

The mechanically fastened ceiling used 1 inch crown×1¼ inch Ig.×16 Ga. staples at 7 inches o.c. along seams and #6×1¼ inch Ig. drywall screws at 12 inch o.c. along field trusses.

The adhesively attached ceiling used an approximate 1¼ inch bead along trusses. A bead was used on one side of field trusses and along a bead on both sides of trusses at gypsum seams.

The gypsum board was attached with the paper wrapped edges aligned parallel to the truss chords.

The initial position was measured after the gypsum seams were taped. Next the ceilings were painted with vapor barrier paint and then spray textured. A second reading was taken immediately after texturing. Rockwool insulation was then blown into the top of the trusses. A third reading was then taken. The temperature and humidity were raised during the time the insulation was blown in. The target temperature and humidity were 90° F. and 90% relative humidity. These conditions were held for seven (7) days while deflections were measured each morning and afternoon. After the seven days, the room was opened and brought down to ambient temperature. Sag measurements were read for three (3) more days, and then the test was terminated.

As shown in FIGS. 2 and 3, gypsum boards made in accordance with the present invention provide significant sag resistance over other gypsum boards and were below the threshold of about 0.1 inch of sag per two foot length of board perceptible to the human eye.

Example 4

Laboratory Gypsum Board Nail Pull Resistance

Laboratory prepared samples of typical paper-covered gypsum boards produced in accordance with the invention were compared with control boards in regard to nail pull resistance. Nail pull resistance is a measure of a combination of the strengths of the board's gypsum core, its paper cover sheets, and the bond between the paper and the gypsum. The test measures the maximum force required to pull a nail with a head through the board until major cracking of the board occurs, and is carried out in accordance with ASTM C473-95.

Slurries were prepared by mixing in a HOBART mixer for 40 seconds at a medium speed: 3.0 kg of beta calcium sulfate hemihydrate; 5 g of CSA set accelerator; 10 g of LC-211 starch (a dry-milled acid-modified non-pregelatinized wheat starch typically included in prior art formulations for gypsum board and commercially available from Archer Daniels Midland Milling Co.); 20 g of fine hammermilled paper fiber; 3 liters of tap water; 0-6 g of STMP; and 0-30 g of PCF1000 pregelatinized corn starch, commercially available from Lauhoff Grain Co.

The slurries thus formed were cast into trays on top of paper and then had paper applied to their top surface to prepare flat gypsum board samples, each having dimensions of about 14×24×½ inches. The paper on one surface was multi-ply with manila outer plies, and the paper on the other surface was multi-ply newsline, both typical of papers employed to prepare paper-covered gypsum board in the board industry. Each board was then held in a 350 F oven until it lost 25 percent weight and was then transferred to and held in a 112 F oven until it reached constant weight.

Final board weight and nail pull resistance were measured. The results are reported in TABLE 3.

TABLE 3

| Nail Pull Resistance | | | |
|---|---|---|---|
| STMP Concentration (weight %) | PCF1000 Starch (weight %) | Board Weight (lbs/1000 ft²) | Nail Pull Resistance (lbs) |
| 0 | 0 | 2465 | 150 |
| 0.1 | 0 | 2454 | 155 |
| 0.2 | 0 | 2326 | 158 |
| 0.1 | 0.5 | 2458 | 168 |
| 0.2 | 1.0 | 2495 | 176 |

The results in TABLE 3 show that boards prepared in accordance with the invention exhibited higher overall strength (nail pull resistance) compared with control boards.

Example 5

Dimensional Stability and Resistance to Permanent Deformation of Production Line Gypsum Board Paper-covered foamed gypsum boards were prepared on a typical full scale production line in a commercial gypsum board manufacturing facility. Boards were prepared with various concentrations of trimetaphosphate ion and were compared with control boards (prepared without trimetaphosphate ion) in regard to dimensional stability and resistance to permanent deformation. Except for the inclusion of trimetaphosphate ion in the preparation of some of the boards, the boards were prepared using methods and ingredients typical of prior art gypsum board production methods and ingredients. The ingredients and their approximate weight percentages (expressed as relatively narrow ranges based upon the weight of calcined gypsum employed) are listed in TABLE 4.

TABLE 4

Gypsum Board Production Ingredients

| INGREDIENT | WEIGHT % |
|---|---|
| beta calcium sulfate hemihydrate | 100 |
| water | 94-98 |
| set accelerator | 1.1-1.6 |
| starch | 0.5-0.7 |
| dispersant | 0.20-0.22 |
| paper fiber | 0.5-0.7 |
| set retarder | 0.07-0.09 |
| foaming agent | 0.02-0.03 |
| sodium trimetaphosphate ("STMP") | 0-0.16 |
| recalcination inhibitor | 0.13-0.14 |

In TABLE 4: the set accelerator comprised finely ground sugar-coated particles of calcium sulfate dihydrate produced by United States Gypsum Company and referred to as "HRA" (which stands for heat resistant accelerator); the starch was dry-milled acid-modified HI-BOND starch obtained commercially from Lauhoff Grain Co.; the dispersant was DILO-FLO, a naphthalene sulfonate obtained commercially from GEO Specialty Chemicals of Ambler, Pa.; the paper fiber was fine hammermilled paper fiber; the set retarder was VERSENEX 80, a chelating agent obtained commercially from Van Walters & Rogers of Kirkland, Wash.; the foaming agent was WITCOLATE1276, obtained commercially from Witco Corp. of Greenwich, Conn.; the sodium trimetaphosphate was supplied commercially by Monsanto Co. of St. Louis, Mo.; and the recalcination inhibitor was CERELOSE 2001, a dextrose employed to reduce recalcination of board ends during drying.

The boards were produced on a four foot wide continuous production line by: continuously introducing and mixing the ingredients in a mixer to form an aqueous slurry (the foaming agent was used to generate aqueous foam in a separate foam generating system; the foam was then introduced into the slurry through the mixer); continuously depositing the slurry on a paper cover sheet (face paper) on a moving belt; placing another paper cover sheet (back paper) over the deposited slurry to form ½ inch thick board; when the hydration of the calcium sulfate hemihydrate to form calcium sulfate dihydrate proceeded far enough to make the slurry hard enough to cut precisely, cutting the moving board to make individual boards of about 12×4 feet and ½ inch thick; and drying the boards in a heated multideck kiln.

Resistance to permanent deformation of the boards was then determined by measuring sag as described in Example 2, except that the boards tested were about 1 foot×4 foot (the 1 foot being in the production line direction, i.e., parallel direction) sections cut from the production boards. Measurement of sag was carried out after conditioning the boards in an environment of 90 F temperature and 90% relative humidity for 24, 48, and 96 hours. Results are reported in TABLE 5 for inventive samples produced with various concentrations of trimetaphosphate ion and control samples (0% sodium trimetaphosphate) produced immediately before and after the inventive samples.

TABLE 5

Production Line Gypsum Board Sap (1 foot × 4 foot Board)

| STMP Concentration (weight %) | Board Sag after 24 hrs. (inches) | Board Sag after 48 hrs. (inches) | Board Sag after 96 hrs. (inches) |
|---|---|---|---|
| 0 (before) | 3.45 | 3.95 | 5.27 |
| 0.004 | 3.23 | 3.71 | 5.19 |
| 0.008 | 2.81 | 3.31 | 4.58 |
| 0.016 | 1.72 | 1.91 | 2.58 |
| 0.024 | 0.96 | 1.12 | 1.61 |
| 0.04 | 0.49 | 0.68 | 0.82 |
| 0.08 | 0.21 | 0.24 | 0.29 |
| 0 (after) | 3.65 | 4.58 | 6.75 |

The data in TABLE 5 illustrate that the boards prepared in accordance with the invention were progressively more resistant to sag (and thus progressively more resistant to permanent deformation) than the control boards, as STMP concentration was increased.

Figure 5:
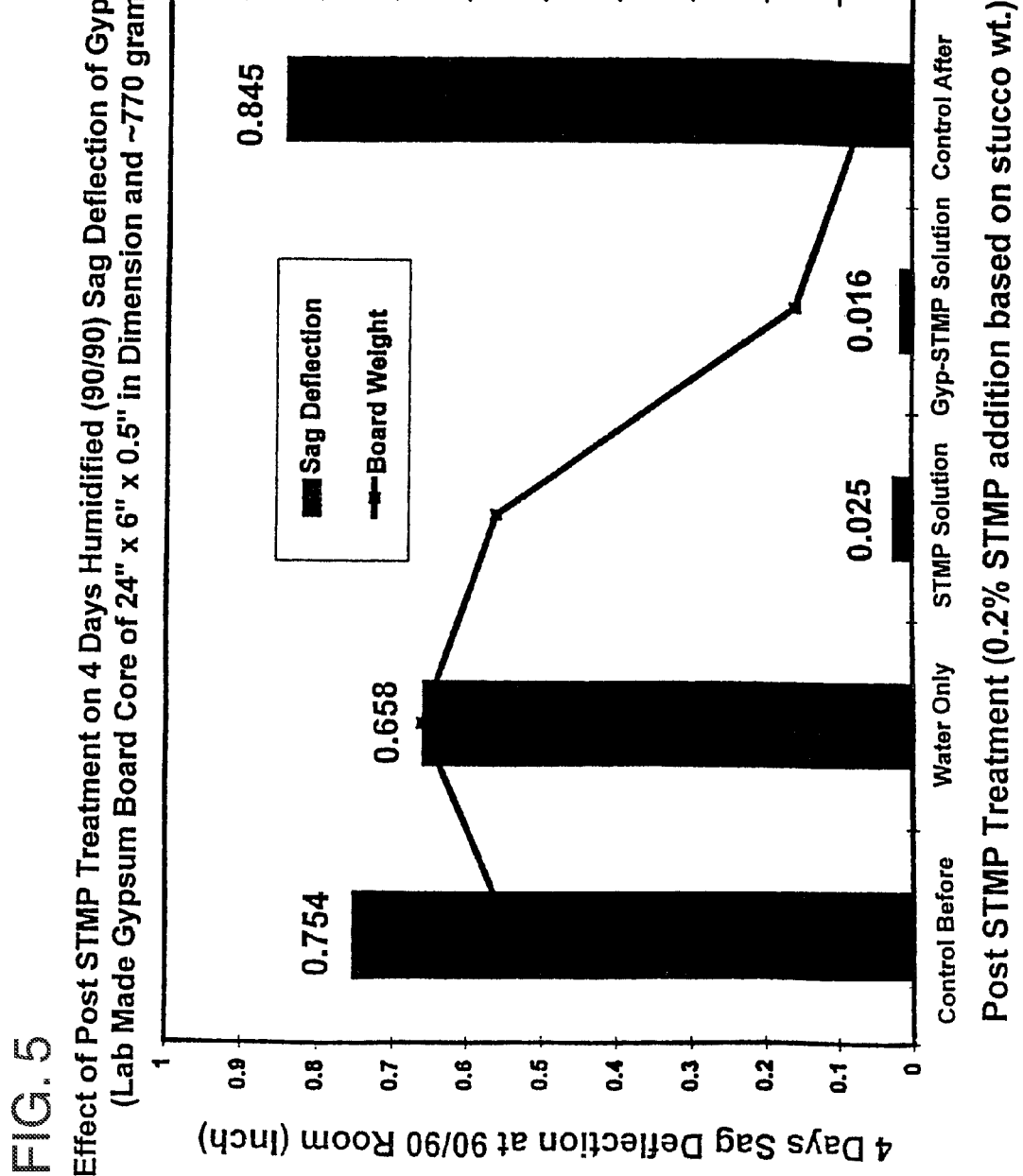
FIG. 5 is a graph depicting the sag deflection effect of treatment of gypsum board in accordance with the present invention prepared from gypsum board comprising previously set and dried gypsum (i.e., calcium sulfate dihydrate).

The sag resistance provided by the compositions and methods of the present invention are further depicted in Table 5A. More specifically, Table 5A shows sag, i.e., humidified deflection in accordance ASTM C 473-95, of a production line gypsum board having the dimensions of 1 foot×2 foot and having the same formulation shown in above Table 4. Table 5A shows the same trends in sag resistance pursuant to ASTM C 473-95 as the trends in the sag resistance for longer boards (1 foot×4 foot) as shown in FIG. 5.

TABLE 5A

Results of ASTM C 473-95 Humidified Deflection Test for Production Line Gypsum Board

| Test Number | STMP Addition (wt %) | Dry Board Weight lb/MSF | 48 Hours Humidified Deflection (inch) f | |
|---|---|---|---|---|
| | | | Parallel | Across |
| Control Before | 0 | 1590 | −0.306 | −0.247 |
| 1 | 0.04 | 1583 | −0.042 | −0.034 |
| 2 | 0.08 | 1609 | −0.027 | −0.021 |
| 3 | 0.16 | 1583 | −0.015 | −0.014 |
| Control After | 0 | 1585 | −0.409 | −0.145 |

Both wet 12×4 ft. production boards and final dried 12×4 ft. production line boards were also measured (in accordance with ASTM C473-95) to determine the amounts of shrinkage of their widths and lengths after drying. The more the boards shrink, the less is their dimensional stability. The results are reported in TABLE 6.

TABLE 6

Production Line Gypsum Board Shrinkage

| STMP Concentration (weight %) | Board Width Shrinkage (inches/4 ft.) | Board Length Shrinkage (inches/12 ft.) |
|---|---|---|
| 0 (control) | 0.13 | 0.38 |
| 0.004 | 0.06 | 0.38 |
| 0.008 | 0 | 0.31 |
| 0.016 | 0 | 0.25 |
| 0.024 | 0 | 0.25 |

TABLE 6-continued

Production Line Gypsum Board Shrinkage

| STMP Concentration (weight %) | Board Width Shrinkage (inches/4 ft.) | Board Length Shrinkage (inches/12 ft.) |
|---|---|---|
| 0.040 | 0 | 0 |
| 0.080 | 0 | 0 |
| 0.16 | 0 | 0 |

The data in TABLE 6 show that boards prepared in accordance with the invention were more dimensionally stable than control boards. At 0.04% STMP addition and above, no length or width shrinkage was found.

Example 6

Sag Resistance Under Humidified and Condensation Conditions

Production Line Gypsum Board

An additional test illustrates sag resistance provided by the compositions and methods of the present invention. More specifically, production line ceiling board was tested wherein controlled condensation was allowed to occur at a vapor barrier placed between the ceiling board and the joists. The method for this test is as follows. A small scale attic and room enclosure was constructed. The attic space was insulated on its top and sides and kept cool to obtain controlled condensation at the ceiling. The ceiling area was 8 foot×8 foot, with 2 foot×8 foot framing and 24 inch o.c. The room space was enclosed by a 6 mil poly vapor barrier at its top and sides, and the humidity of the room space was elevated to obtain controlled condensation at the ceiling.

Two 4 foot×8 foot boards of test material (one trial product and one control) were attached side-by-side to the trusses, with the 6 mil polyethylene vapor barrier located directly above the board. The ends of the board were not fastened. The humidity in the room portion was then increased via a vaporizing humidifier while the temperature in the attic was lowered using a window air conditioning unit. The vapor output of the humidifier was adjusted until a constant condensation occurred at the vapor barrier above the ceiling board. No attempt was made to maintain constant temperature and humidity throughout the test. The results should therefore be viewed as a relative measure of sag resistance performance between the trial and control products, and not an attempt to predict the amount of sag in a defined conditioned environment.

Ceiling sag was then periodically measured for three locations along the board (at midspan between each pair of trusses), giving a total of six deflection readings per product per test. The temperature of the attic and room enclosures were also recorded at each sag measurement.

For background information, the theoretical dew point conditions (assuming a constant 70° F. room temperature) are shown below.

| Room Temp. | Room Relative Humidity | Attic Temp. |
|---|---|---|
| 70° F. | 50% | 51° F. |
| 70° F. | 60% | 56° F. |
| 70° F. | 70% | 60° F. |
| 70° F. | 80% | 63° F. |
| 70° F. | 90% | 68° F. |

A test was performed over a nineteen day period using the following material: ½ inch product line gypsum board made in accordance with the present invention; and ⅝ inch Firecode Type X gypsum board as previously described. Results are shown in the FIG. 4 and show the board made in accordance with the present invention has consistently less sag than the control, i.e., ⅝ inch Firecode Type X gypsum board as previously described.

In this test a distributed load of 1.0 lb/lineal foot was applied at midspan between each truss immediately following the reading of Day 8. Application of this load significantly increased sag of the control board, but had much less effect on the board of the present invention.

Figure 4:
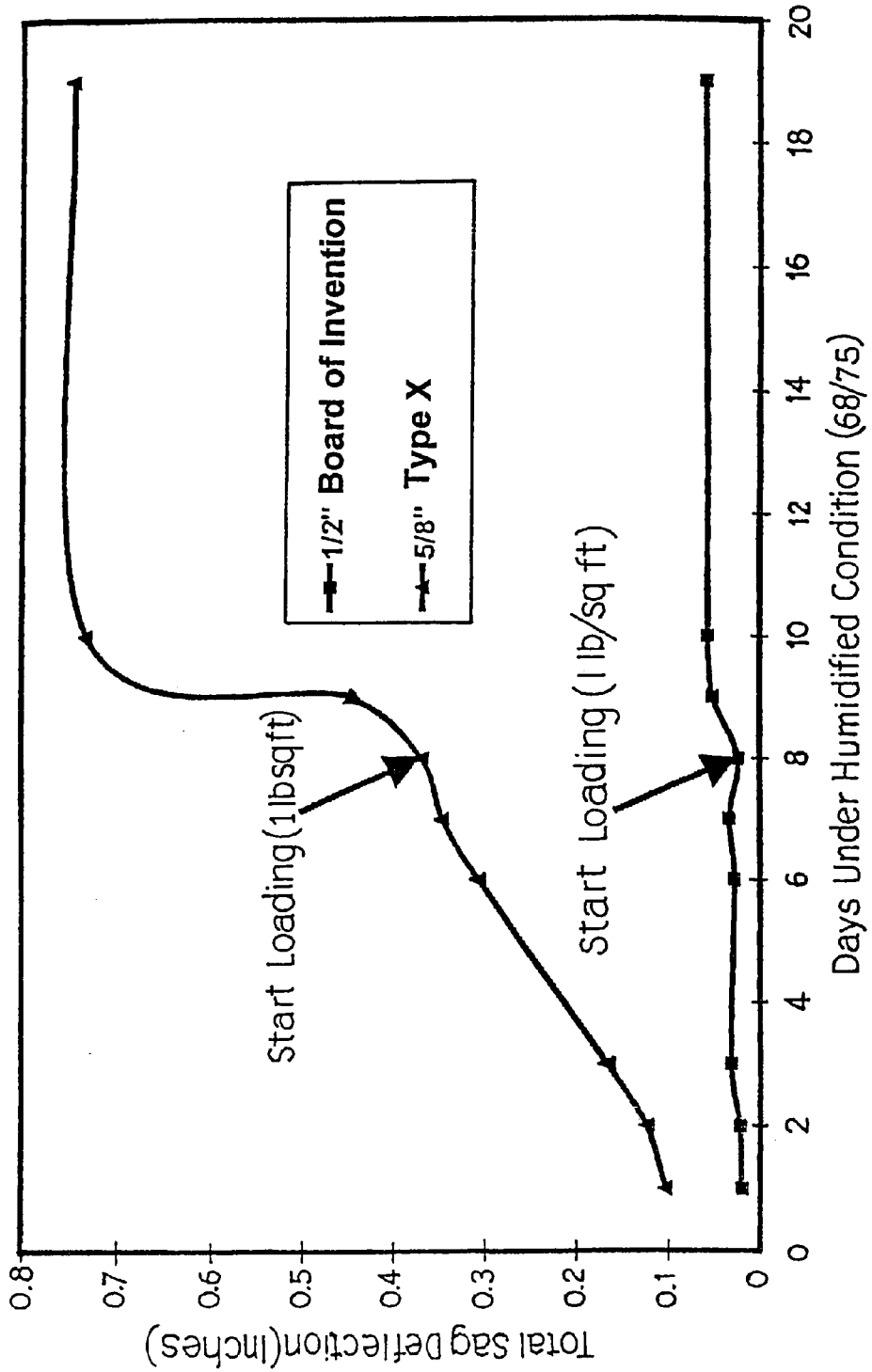
FIG. 4 is a graph comparing the sag deflection effect of a gypsum board made in accordance with the present invention and a commercially available gypsum board.

As shown in FIG. 4, gypsum boards made in accordance with the present invention have deflection of sag that is significantly below that which is perceptible to the human eye, i.e., less than 0.1 inch per two foot length.

Example 7

Production Line Gypsum Board Nail Pull Resistance

Another set of paper-covered foamed gypsum boards was prepared on a typical full scale production line in a gypsum board manufacturing facility. Boards were prepared with three concentrations of trimetaphosphate ion and were compared with control boards (prepared without trimetaphosphate ion) in regard to nail pull resistance.

Except for the inclusion of trimetaphosphate ion in the preparation of some of the boards, the boards were prepared using methods and ingredients typical of prior art gypsum board production methods and ingredients. The ingredients and their weight percentages were the same as those listed in TABLE 4 above. The method of preparation of the boards was as described in EXAMPLE 5.

Nail pull resistance was determined in accordance with ASTM C473-95. Results are reported in TABLE 7 for inventive samples produced with various concentrations of trimetaphosphate ion and control samples (0% sodium trimetaphosphate) produced immediately before and after the inventive samples.

TABLE 7

Production Line Gypsum Board Nail Pull Resistance

| STMP Concentration (weight %) | Nail Pull Resistance (lbs) |
|---|---|
| 0 (before) | 89 |
| 0.04 | 93 |
| 0.08 | 96 |
| 0.16 | 99 |
| 0 (after) | 90 |

The results in TABLE 7 show that production boards prepared in accordance with the invention exhibited higher overall strength (nail pull resistance) compared with control boards.

Example 8

Production Line Gypsum Board Paper Bond Integrity

Another set of paper-covered foamed gypsum boards was prepared on a typical full scale production line in a gypsum board manufacturing facility. Boards were prepared with various concentrations of trimetaphosphate ion, pregelatinized starch, and non-pregelatinized starch and were compared with control boards (prepared without trimetaphosphate ion or pregelatinized starch) in regard to the integrity of the bond between the gypsum board core and its face cover paper after conditioning under extremely wet and humidified conditions.

Except for the inclusion of trimetaphosphate ion and pregelatinized starch and the varying of the concentration of non-pregelatinized starch in the preparation of some of the boards, the boards were prepared using methods and ingredients typical of prior art gypsum board production methods and ingredients. The ingredients and their weight percentages were the same as those listed in TABLE 4 above. The method of preparation of the boards was as described in EXAMPLE 5.

The pregelatinized starch employed in the tests was PCF1000, commercially available from Lauhoff Grain Co. The non-pregelatinized starch was HI-BOND, a dry-milled acid-modified non-pregelatinized starch commercially available from Lauhoff Grain Co.

After production line preparation of the boards, samples with dimensions of 4×6×½ inches (the 4 inches being in the production line direction) were cut from the boards. Each of these smaller board samples was then conditioned by keeping the total area of the outer surface of the cover paper on its face side in contact with a fully water-soaked cloth for about 6 hours in an environment of 90 F temperature and 90 percent relative humidity and then removing the wet cloth and allowing the board sample to slowly dry in that same environment until it reached constant weight (usually about 3 days). A one eighth inch-deep straight score was then made in the rear surface of the board sample 2½ inches from and parallel to one of the 6 inch edges. The board core was then snapped along the score without breaking or stressing the paper on the face side of the board, and the larger (2½×6 inches) piece of the board sample was then rotated and forced downward while the smaller piece was held stationary and horizontally with its rear surface up, in an attempt to force the face paper on the face side of the board to peel away from the larger piece. The force was increased until the two board pieces came completely apart. The face surface of the larger piece was then examined to determine on what percentage of its surface the face paper had pulled completely away from the core (referred to as "clean peel"). This percentage is reported in TABLE 8 as the "% Bond Failure".

TABLE 8

Production Line Gypsum Board Paper Bond Failure

| HI-BOND Concentration (weight %) | STMP Concentration (weight %) | PCF1000 Concentration (weight %) | % Bond Failure (%) |
|---|---|---|---|
| 0.60 | 0 | 0 | 87 |
| 0.60 | 0.08 | 0 | 97 |
| 0.96 | 0.08 | 0 | 97 |
| 0.60 | 0.08 | 0.16 | 42 |
| 0.60 | 0.08 | 0.32 | 0 |

TABLE 8-continued

Production Line Gypsum Board Paper Bond Failure

| HI-BOND Concentration (weight %) | STMP Concentration (weight %) | PCF1000 Concentration (weight %) | % Bond Failure (%) |
|---|---|---|---|
| 0.28 | 0.08 | 0.32 | 20 |
| 0.60 | 0 | 0 | 83 |

The data in TABLE 8 show that in regard to the problem of paper-to-core bond failure after extremely wet conditioning: STMP aggravates the problem; increasing the concentration of typical non-pregelatinized starch (HI-BOND) does not alleviate the problem; adding some pregelatinized starch (PCF1000) alleviates or eliminates the problem.

Example 9

Post Treatment of Calcium Sulfate Dihydrate

In some alternative preferred embodiments of the present invention, calcium sulfate dihydrate cast is treated with an aqueous solution of trimetaphosphate ion, in a manner sufficient to uniformly disperse the solution of trimetaphosphate ion in the calcium sulfate dihydrate cast, to increase strength, resistance to permanent deformation (e.g., sag resistance), and dimensional stability of set gypsum-containing products after redrying. More specifically, treatment of calcium sulfate dihydrate cast with trimetaphosphate ion has been discovered to increase strength, resistance to permanent deformation (e.g., sag resistance) and dimensional stability to an extent similar to that achieved by the embodiments wherein trimetaphosphate ion is added to calcined gypsum. Thus, the embodiment wherein the trimetaphosphate ion is added to set gypsum provides new compositions and methods for making improved gypsum-containing products, including but not limited to boards, panels, plasters, tiles, gypsum/cellulose fiber composites, etc. Therefore, any gypsum based product which requires strict control over sag resistance will benefit from this embodiment of the present invention. The treatment also increases gypsum cast strength by ~15%. Trimetaphosphate ion can be loaded at 0.04-2.0% (based on gypsum weight) into gypsum cast by spraying or soaking with an aqueous solution containing trimetaphosphate ion and then redrying the gypsum cast.

Two methods of post treatment of set gypsum are as follows.

1)

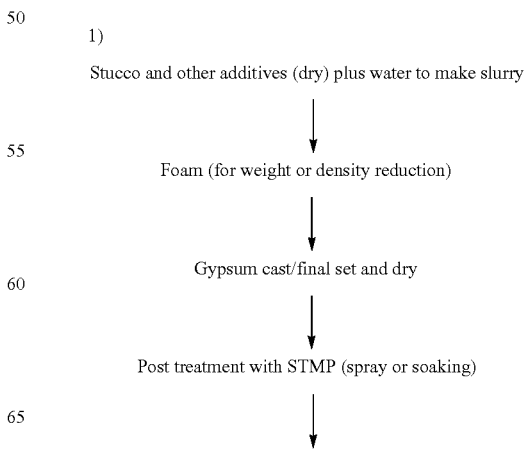

Stucco and other additives (dry) plus water to make slurry

↓

Foam (for weight or density reduction)

↓

Gypsum cast/final set and dry

↓

Post treatment with STMP (spray or soaking)

↓

-continued

Redry gypsum cast
Improved gypsum product

2)
Stucco and other additives (dry) plus water to make slurry
Mixing/Stirring (wet)
Gypsum cast/final set
Post treatment with STMP (spray the surface)
Dry gypsum product
Improved gypsum product In both of the above methods, the aqueous solution of trimetaphosphate ion is preferably applied in an amount and manner sufficient to create a concentration of about 0.04-0.16% by weight (based on the weight of calcium sulfate dihydrate) of trimetaphosphate ion in the calcium sulfate dihydrate cast.

Benefits of reduction in sag deflection (i.e., sag resistance) of the first method above are shown in FIG. 5. Five (5) boards were made and tested for sag deflection as shown in FIG. 5. The dried boards weighed in the range of 750 to 785 grams. The control boards did not have any solution applied to them after gypsum cast/final set and dry. The board identified as the water only board had only water applied as a spray to the set and dried gypsum cast, and was then redried. The board identified as the STMP solution board had a 1 wt. % trimetaphosphate ion aqueous solution applied as a spray to the set and dried gypsum cast, and was then redried. The board identified as Gyp-STMP solution had an aqueous mixture saturated with gypsum and containing 1% by weight trimetaphosphate ion applied as a spray to the set and dried gypsum cast, and was then redried. In general, it is preferred to have the solution to be sprayed contain a concentration of trimetaphosphate ion in the range of 0.5% to 2%. The final amount of trimetaphosphate ion in both the STMP solution board and the Gyp-STMP solution board was 0.2% based on weight of stucco used to make the gypsum cast and 0.17% based on weight of the resulting set gypsum board.

Example 10

Treatment of High Salt Materials

Other embodiments the invention concern set gypsum-containing products prepared from mixtures of calcium sulfate materials and water containing high concentrations of chloride ions or salts thereof (i.e., at least 0.015 weight percent, based on the weight of calcium sulfate materials in the mixture). The chloride ions or salts thereof may be impurities in the calcium sulfate material itself or the water (e.g., sea water or brine-containing subsurface water) employed in the mixture, which prior to the present invention could not be used to make stable set gypsum-containing products because of attendant problems, such as blisters, paper bond failure, end burning, low resistance to permanent deformation, low strength, and low dimensional stability.

The tests included in Table 9 concern gypsum boards prepared and treated in the same manner as described in Example 2, except that various amounts of chloride ion were introduced into the mixture along with various amounts of trimetaphosphate ion. The sag deflection was tested in the same manner as described in Example 2.

TABLE 9

Lab test results of gypsum cubes (2 × 2 × 2)/board core (24 × 6 × 0.5) cast from stucco with various STMP & sodium chloride addition

| Sodium Chloride Addition (wt. %) | STMP Addition (wt. %) | Dry Board Weight (grams) | Water Pick-Up from 90/90 Room (wt. %) | 48 Hrs Humidified Sag Deflection (inches) | Compressive Strength Of Dried Cubes (psi) |
|---|---|---|---|---|---|
| 0 | 0 | 534 | 0.17 | 0.445 | 675 |
| 0.2 | 0 | 535 | 0.88 | 2.086 | 697 |
| 0.5 | 0 | 528 | 1.91 | 4.086 | 603 |
| 1.0 | 0 | 500 | 4.74 | >6 | 448 |
| 2.0 | 0 | 481 | 6.94 | >6 | 304 |
| 0.5 | 0 | 530 | 1.90 | 3.752 | 613 |
| 0.5 | 0.1 | 526 | 1.94 | 0.006 | 678 |
| 0.5 | 0.2 | 527 | 1.92 | 0.007 | 684 |
| 0.5 | 0.3 | 518 | 1.95 | 0.005 | 662 |
| 0.5 | 0.5 | 508 | 1.89 | 0.003 | 668 |
| 0.8 | 0 | 509 | 2.93 | 5.786 | 477 |
| 0.8 | 0.1 | 509 | 3.07 | 0.014 | 540 |
| 0.8 | 0.2 | 505 | 2.91 | 0.007 | 543 |
| 0.8 | 0.4 | 501 | 2.99 | 0.010 | 538 |
| 0.8 | 0.8 | 500 | 2.96 | 0.005 | 554 |

The tests included in Table 10 show that treatment with trimetaphosphate ion permits the use of mixtures containing high concentrations of chloride ions or salts thereof. The boards were prepared and treated in the same manner as in Example 4, except that various amounts of chloride ion were introduced into the mixture along with various amounts of trimetaphosphate ion. The integrity of the bond between the gypsum board core and its face cover paper was tested in the same manner as described in Example 8.

Table 12 shows treatment with trimetaphosphate ion and PFC 1000 starch of even higher (than shown in Table 11) chloride salt materials (0.368 wt. % of chloride salt in stucco) of boards that were otherwise prepared and treated in a manner similar to that previously described in Example 5. As shown in Table 12, the treatment results in an increase in nail pull strength (measured in the same manner as Example 4, i.e., ASTM C 473-95) and provides better bond performance (measured in the same manner as Example 8) as compared with control boards.

TABLE 10

Paper-to-core bond test results of lab cast gypsum board (24 x 14 x 0.5) cast from stucco at various STMP, PCF 1000 & LC-211 starch, and salt addition

| Salt Addition (wt. %) | STMP Addition (wt. %) | PCF1000 & LC-211 Addition (wt. %) | Dry Board Weight (grams) | Water Pick-up After 5 Days in 90/90 Room (wt. %) | 5 Days Bond Failure (%) | 3 Hrs Humidified Bond Failure (%) | 3 Days Humidified Bond Failure (%) | Wet & Humidified Bond Failure (%) |
|---|---|---|---|---|---|---|---|---|
| 0 | 0 | 0.2 & 0.2 | 2271 | 0.29 | 0 | 5 | 0 | 2 |
| 0.2 | 0 | 0.2 & 0.2 | 2290 | 0.81 | 1 | 0 | 0 | 0 |
| 0.6 | 0 | 0.2 & 0.2 | 2284 | 2.12 | 2 | 8 | 0 | 0 |
| 0.2 | 0.1 | 0.2 & 0.2 | 2269 | 0.87 | 0 | 1 | 2 | 1 |
| 0.6 | 0.1 | 0.2 & 0.2 | 2267 | 1.95 | 2 | 3 | 0 | 0 |
| 0.6 | 0.2 | 0.2 & 0.2 | 2271 | 2.07 | 3 | 0 | 3 | 2 |
| 1.0 | 0.2 | 0.2 & 0.2 | 2285 | 3.61 | 9 | 14 | 3 | 10 |

Table 11 shows treatment with trimetaphosphate ion and PFC 1000 starch of high chloride salt materials (0.08 to 0.16 wt. % of sodium chloride in stucco) of boards that were otherwise prepared and treated in a manner similar to that previously described in Example 5. As shown in Table 11, the treatment results in an increase in nail pull strength (measured in the same manner as Example 4, i.e., ASTM C 473-95) and provides similar bond performance (measured in the same manner as Example 8) as compared with control boards with no sodium chloride. Further, trimetaphosphate ion treatment provided significant improvement in humidified sag, even up to 0.3% chloride salt addition.

TABLE 11

PLANT TEST RESULTS OF HIGH-SALT TRIAL AT GYPSUM PILOT FACILITY

| Trial Period | NaCl Salt Addition (wt. %) | STMP Addition (wt. %) | Hi-Bond Starch (wt. %) | PCF 1000 Starch (wt. %) | Board Weight (lb/MSF) | Nail Pull Strength (lb) | Paper to Core Bond Load (lb) | Paper to Core Bond % Fail (%) | 24 Hrs. Humidified Sag (1' x 4') (inches/4 ft span) |
|---|---|---|---|---|---|---|---|---|---|
| 1 (Control) | 0 | 0 | 0.52 | 0 | 1581 | 88.7 | 14.8 | 13.6 | 3.25 |
| 2 | 0 | 0 | 0.28 | 0.24 | 1586 | 92.1 | 13.30 | 15.3 | 2.45 |
| 3 | 0.08 | 0 | 0.28 | 0.24 | 1577 | 89.3 | 11.20 | 13.7 | 5.25 |
| 4 | 0.16 | 0 | 0.28 | 0.24 | 1580 | 87.7 | 11.50 | 22.4 | 11.5 |
| 5 | 0.3 | 0 | 0.28 | 0.24 | 1574 | 89.6 | 9.00 | 31.8 | >12.5 |
| 6 | 0.3 | 0.08 | 0.28 | 0.24 | 1577 | 89.2 | 8.10 | 30.3 | 0.25 |
| 7 | 0.16 | 0.08 | 0.28 | 0.24 | 1567 | 95.5 | 11.40 | 32.8 | 0.25 |
| 8 | 0.08 | 0.08 | 0.28 | 0.24 | 1592 | 94.5 | 12.20 | 19.5 | 0.25 |
| 9 | 0 | 0 | 0.28 | 0.24 | 1609 | 93.6 | 12.40 | 15.1 | 2.85 |
| 10 (Control) | 0 | 0 | 0.52 | 0 | 1561 | 83.9 | 14.90 | 11.5 | 2.25 |
| 11 | 0.3 | 0 | 0.52 | 0 | 1619 | 93.4 | 10.10 | 25.4 | >12.5 |

TABLE 12

PLANT TEST RESULTS OF HIGH-SALT TRIAL AT BOARD PLANT

| Trial Period | % High-Chloride Synthetic Gypsum (wt. %) | Chloride Salt Concentration (wt. %) | STMP Addition (wt. %) | Hi-Bond Starch (wt. %) | PCF-1000 Starch (wt. %) | Nail Pull Strength (lb) | Paper-to-Core Bond Load (lb) | Paper-to-Core Bond % Fail (%) |
|---|---|---|---|---|---|---|---|---|
| 1 (Control) | 0 | 0.032 | 0 | 0.4 | 0 | 73 | 14.10 | 49.0 |
| 2 | 50 | 0.12 | 0.16 | 0.15 | 0.25 | 85 | 16.70 | 0.0 |
| 3 | 100 | 0.368 | 0.16 | 0.15 | 0.25 | 86 | 14.40 | 0.0 |
| 4 | 100 | 0.368 | 0.16 | 0.4 | 0 | 89 | 10.90 | 34.0 |
| 5 | 100 | 0.368 | 0 | 0.4 | 0 | 77 | 19.70 | 0.0 |
| 6 (Control) | 0 | 0.032 | 0 | 0.4 | 0 | 75 | 19.5 | 10.0 |

Example 11

Treatment of Calcined Gypsum with Various Enhancing Materials

In the example of the preferred embodiments previously discussed, the enhancing material is trimetaphosphate ion. However, in general, any enhancing materials that fall within the general definition of enhancing materials previously discussed will produce beneficial results (e.g., increased resistance to permanent deformation) in treatment of calcined gypsum. The generally useful enhancing materials are condensed phosphoric acids, each of which comprises 2 or more phosphoric acid units; and salts or ions of condensed phosphates, each of which comprises 2 or more phosphate units.

Specific examples of such enhancing materials include, e.g., the following acids or salts, or the anionic portions thereof: sodium trimetaphosphate having the molecular formula $(NaPO_3)_3$, sodium hexametaphosphate having 6-27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having 2 or more repeating phosphoric acid units and having the molecular formula $H_{n+2}P_nO_{3n+1}$ wherein n is 2 or more.

Results of using such enhancing materials to treat calcined gypsum are shown in Tables 13, 14, and 15.

In Table 13 various enhancing materials were used to treat calcined gypsum in the process of preparing gypsum boards and cubes. The boards were prepared and treated in the same manner as previously in described in Example 2. The cubes were prepared and treated in the same manner as previously described in Example 1. Except in both cases, various different enhancing materials were used rather than just trimetaphosphate ion. Humidified sag deflection was measured in the same manner as previously described in Example 2. Compressive strength was measured in the same manner as previously described in Example 1.

In Table 14 polyphosphoric acid was used to treat calcined gypsum in the process of preparing gypsum boards and cubes. The boards were prepared and treated in the same manner as previously in described in Example 2. The cubes were prepared and treated in the same manner as previously described in Example 1. Except in both cases, various different enhancing materials were used rather than just trimetaphosphate ion. Humidified sag deflection was measured in the same manner as previously described in Example 2. Compressive strength was measured in the same manner as previously described in Example 1.

In Table 15 ammonium polyphosphate ("APP") was used to treat calcined gypsum in the process of preparing gypsum boards and cubes. The boards were prepared and treated in the same manner as previously in described in Example 2. The cubes were prepared and treated in the same manner as previously described in Example 1. Except in both cases, various different enhancing materials were used rather than just trimetaphosphate ion. Humidified sag deflection was measured in the same manner as previously described in Example 2. Compressive strength was measured in the same manner as previously described in Example 1.

The results in Tables 13, 14, and 15 show that all materials tested that are within the definition of enhancing materials above, when used to treat calcined gypsum in the production of set gypsum-containing products, cause the products to exhibit significant resistance to permanent deformation compared with the controls.

TABLE 13

Lab test results of gypsum cubes (2 × 2 × 2) and boards (24 × 6 × 0.5) cast from stucco with various phosphate & chloride addition

| Phosphate Salts Or Other Specified Chemicals | Addition Level (wt. %) | Dry Board Weight (gram) | Retard (−), Neutral (0) or Accelerate (+) | Water Pick-Up from 90/90 Room (wt. %) | Ten Day Humidified Sag Deflection (inches) | Compressive Strength of Dried Cubes (psi) |
|---|---|---|---|---|---|---|
| Sodium Trimetaphosphate | 0.1 | 537.0 | 0/+ | 0.06 | 0.016 | 745 |
| Sodium Hexametaphosphate | 0.1 | 538.2 | -- | 0.09 | 0.019 | 552 |
| Sodium Chloride & Sodium Trimetaphosphate | 0.5 & 0.1 | 527.5 | + | 1.93 | 0.008 | 621 |
| Sodium Chloride & Sodium Hexametaphosphate | 0.5 & 0.1 | 539.6 | −/0 | 2.08 | 0.021 | 498 |

TABLE 13-continued

Lab test results of gypsum cubes (2 × 2 × 2) and boards (24 × 6 × 0.5) cast from stucco with various phosphate & chloride addition

| Phosphate Salts Or Other Specified Chemicals | Addition Level (wt. %) | Dry Board Weight (gram) | Retard (−), Neutral (0) or Accelerate (+) | Water Pick-Up from 90/90 Room (wt. %) | Ten Day Humidified Sag Deflection (inches) | Compressive Strength of Dried Cubes (psi) |
|---|---|---|---|---|---|---|
| Tetrapotassium Pyrophosphate | 0.1 | 538.7 | −/0 | 0.11 | 0.137 | 560 |
| Trisodium Dipotassium Tripolyphosphate | 0.1 | 538.8 | −/0 | 0.07 | 0.201 | 552 |
| Sodium Tripolyphosphate | 0.1 | 535.1 | −/0 | 0.09 | 0.286 | 531 |
| Tetrasodium Pyrophosphate | 0.1 | 556.2 | −/0 | 0.18 | 0.436 | 544 |
| Aluminum Trimetaphosphate | 0.1 | 536.2 | 0/0 | 0.02 | 0.521 | 673 |
| Monopotassium DihydrogenPhosphate | 0.1 | 540.9 | 0/+ | 0.11 | 0.595 | 657 |
| Sodium Acid Pyrophosphate | 0.1 | 547.7 | 0/0 | 0.16 | 1.385 | 637 |
| Boric Acid | 0.1 | 539.4 | 0/0 | 0.15 | 1.425 | 624 |
| Trisodium Phosphate | 0.1 | 537.0 | −− | 0.13 | 1.641 | 537 |
| Control | 0.0 | 546.2 | 0/0 | 0.13 | 1.734 | 635 |
| Phosphoric Acid | 0.1 | 534.0 | + | 0.22 | 1.796 | 673 |
| Monosodium DihydrogenPhosphate | 0.1 | 540.9 | + | 0.19 | 2.219 | 679 |
| Magnesium Chloride | 0.1 | 528.2 | 0/+ | 0.23 | 2.875 | 521 |
| Disodium MonohydrogenPhosphate | 0.1 | 536.6 | 0/0 | 0.13 | 3.126 | 629 |
| Sodium Aluminum Sulfate | 0.1 | 543.0 | ++ | 0.24 | 3.867 | 686 |
| Zinc Chloride | 0.1 | 536.2 | 0/+ | 0.67 | >6.0 | 470 |
| Aluminum Chloride | 0.1 | 536.8 | +++ | 0.53 | >6.0 | 464 |
| Sodium Chloride | 0.1 | 542.6 | + | 0.63 | >6.0 | 596 |

TABLE 14

Lab test results of gypsum cubes (2 × 2 × 2)/boards (24 × 6 × 0.5) cast from stucco with polyphosphoric acid addition

| Polyphosphoric Acid | Addition Level (wt. %) | Dry Board Weight (gram) | Retard (−), Neutral (0) or Accelerate (+) | Water Pick-Up from 90/90 Room (wt. %) | Two Weeks Humidified Sag Deflection (inches) | Compressive Strength Of Dried Cubes (psi) |
|---|---|---|---|---|---|---|
| No Phosphoric Acid (Control) | 0.0 | 536.5 | 0/0 | 0.06 | 0.683 | 767 |
| Polyphosphoric acid (mixing with water first) | 0.02 | 539.6 | 0/0 | 0.13 | 0.042 | 781 |
| Polyphosphoric acid (mixing with water first) | 0.05 | 535.1 | 0/0 | 0.09 | 0.025 | 842 |
| Polyphosphoric acid (mixing with water first) | 0.1 | 542.3 | −/0 | 0.15 | 0.046 | 708 |

TABLE 15

Lab test results of gypsum cubes (2 × 2 × 2)/boards (24 × 6 × 0.5) cast from stucco with ammonium polyphosphate addition

| Ammonium Polyphosphate ("APP") | Addition Level (wt. %) | Dry Board Weight (gram) | Retard (−), Neutral (0) or Accelerate (+) | Water Pick-Up from 90/90 Room (wt. %) | Two Weeks Humidified Sag Deflection (inches) | Compressive Strength Of Dried Cubes (psi) |
|---|---|---|---|---|---|---|
| Control | 0.0 | 540.7 | 0/0 | 0.35 | 0.694 | 912 |
| APP Powder (mixing with water first) | 0.01 | 532.5 | 0/0 | 0.35 | 0.045 | 937 |
| APP Powder (mixing with water first) | 0.03 | 536.3 | 0/0 | 0.37 | 0.020 | 924 |
| APP Powder (mixing with water first) | 0.05 | 539.7 | 0/0 | 0.37 | 0.005 | 901 |
| APP Powder (mixing with water first) | 0.1 | 541.3 | 0/0 | 0.28 | 0.005 | 956 |
| APP Powder (mixing with water first) | 0.2 | 546.7 | 0/0 | 0.30 | 0.003 | 967 |
| APP Powder (mixing with water first) | 0.4 | 538.2 | 0/0 | 0.33 | 0.005 | 998 |
| APP Powder (mixing with stucco first) | 0.05 | 533.5 | 0/0 | 0.35 | 0.005 | 907 |
| APP Powder (mixing with stucco first) | 0.1 | 546.9 | 0/0 | 0.30 | 0.006 | 948 |
| APP Powder (mixing with stucco first) | 0.2 | 538.3 | 0/0 | 0.31 | 0.006 | 998 |
| APP Powder (mixing with stucco first) | 0.4 | 537.4 | 0/0 | 0.35 | 0.002 | 1017 |

Example 12

Treatment of Calcium Sulfate Dihydrate Cast with Various Enhancing Materials

In general, any enhancing materials that fall within the general definition of enhancing materials previously discussed will produce beneficial results (e.g., increased resistance to permanent deformation, and increased strength) in treatment of calcium sulfate dihydrate cast. The generally useful enhancing materials are condensed phosphoric acids, each of which comprises 2 or more phosphoric acid units; and salts or ions of condensed phosphates, each of which comprises 2 or more phosphate units.

Results of using such enhancing materials to treat calcium sulfate dihydrate cast are shown in Table 16.

In Table 16 various different materials were used to treat set and dried calcium sulfate dihydrate in the form of boards and cubes. The boards were prepared in the same manner as previously in described in Example 2 and further treated in the same manner as Example 9. The cubes were prepared in the same manner as previously described in Example 1 and further treated in a manner similar to that used in Example 9. Except in both cases, various different enhancing materials were used rather than just trimetaphosphate ion. Humidified sag deflection was measured in the same manner as previously described in Example 2. Compressive strength was measured in the same manner as previously described in Example 1.

The results in Table 16 show that all materials tested that are within the definition of enhancing materials above, when used to treat set and dried calcium sulfate dihydrate cast, cause the resulting products to exhibit significant resistance to permanent deformation and significant increased strength compared with the controls.

TABLE 16

Lab test results of post-treated gypsum cube (2 × 2 × 2)/board (24 × 6 × 0.5) cast from stucco with various phosphate & chloride addition

| Phosphate Salts Or Other Specified Chemicals | Addition Level (wt. %) | Dry Board Weight (gram) | Water Pick-Up from 90/90 Room (wt. %) | Ten Day Humidified Sag Deflection (inches) | Compressive Strength Of Dried Cubes(psi) |
|---|---|---|---|---|---|
| Sodium Trimetaphosphate | 0.4 | 537.0 | 0.5 | 0.016 | 725 |
| Sodium Hexametaphosphate | 0.4 | 538.2 | 0.9 | 0.019 | 697 |
| Tetrapotassium Pyrophosphate | 0.4 | 538.7 | 0.3 | 0.017 | |
| Tetrasodium Pyrophosphate | 0.4 | 556.2 | 0.6 | 0.011 | |
| Sodium Acid Pyrophosphate | 0.4 | 542.1 | 0.4 | 0.012 | |
| Monosodium Dihydrogen Phosphate | 0.4 | 545.6 | 1.5 | 0.025 | 710 |
| Monopotassium Dihydrogen Phosphate | 0.4 | 487.5 | 0.2 | 0.029 | 708 |
| Phosphoric Acid | 0.4 | 534.7 | 0.4 | 0.065 | 624 |
| Sodium Tripolyphosphate | 0.4 | 540.5 | 0.6 | 0.123 | 657 |
| Boric Acid | 0.4 | 486.6 | 0.1 | 0.345 | 611 |
| Control | 0.0 | 543.9 | 0.2 | 0.393 | 576 |
| Disodium Monohydrogen Phosphate | 0.4 | 541.3 | 0.7 | 0.674 | 724 |
| Trisodium Phosphate | 0.4 | 532.8 | 0.6 | 1.082 | 754 |
| Magnesium Chloride | 0.4 | 559.9 | 2.3 | 1.385 | 567 |
| Sodium Chloride | 0.4 | 539.4 | 7.7 | 6.385 | 521 |

The invention has been described in detail with particular reference to certain preferred embodiments thereof, but it should be appreciated that variations and modifications can be effected within the spirit and scope of the invention.

What is claimed is:

1. A joint compound comprising (a) at least one of (i) binder or (ii) thickener, (b) calcium sulfate material, (c) water, and (d) one or more enhancing materials chosen from the group consisting of: condensed phosphoric acids, each of which comprises 2 or more phosphoric acid units; and salts or ions of condensed phosphates, each of which comprises 2 or more phosphate units, the calcium sulfate material is calcined gypsum and the amount of enhancing material is from about 0.004 to about 2.0 percent by weight, based on the weight of the calcined gypsum.

2. The joint compound of claim 1, the enhancing material or materials having been included in the mixture in an amount such that the set gypsum formed has greater resistance to permanent deformation than it would have if the enhancing material had not been included in the mixture.

3. The joint compound of claim 1, wherein the enhancing material comprises sodium trimetaphosphate.

4. The joint compound of claim 1, wherein the mixture comprises binder.

5. The joint compound of claim 1, wherein the mixture comprises thickener.

6. The joint compound of claim 1, wherein the mixture further comprises non-leveling agent.

7. The joint compound of claim 1, wherein the mixture comprises binder and thickener.

8. The joint compound of claim 7, wherein the mixture further comprises non-leveling agent.

9. The joint compound of claim 1, wherein the mixture further comprises pregelatinized starch.

10. The joint compound of claim 9, wherein the pregelatinized starch is in an amount of from about 0.08 to about 0.5 percent by weight, based on the weight of the calcined gypsum.

11. The joint compound of claim 1, wherein the amount of enhancing material is from about 0.04 to about 0.16 percent by weight, based on the weight of the calcined gypsum.

12. The joint compound of claim 1, wherein the mixture comprises chloride ions or salts thereof.

13. A joint compound comprising (a) at least one of (i) binder or (ii) thickener, (b) calcium sulfate material, (c) water, and (d) one or more enhancing materials chosen from the group consisting of: condensed phosphoric acids, each of which comprises 2 or more phosphoric acid units; and salts or ions of condensed phosphates, each of which comprises 2 or more phosphate units, the calcium sulfate material is calcined gypsum and the enhancing material or materials having been included in the mixture in an amount such that when the joint compound is set, the joint compound has greater resistance to permanent deformation than it would have if the enhancing material had not been included in the mixture.

14. The joint compound of claim 13, wherein the enhancing material comprises sodium trimetaphosphate.

15. The joint compound of claim 13, wherein the mixture comprises binder.

16. The joint compound of claim 13, wherein the mixture comprises thickener.

17. The joint compound of claim 13, wherein the mixture further comprises non-leveling agent.

18. The joint compound of claim 13, wherein the mixture comprises binder and thickener.

19. The joint compound of claim 18, wherein the mixture further comprises non-leveling agent.

20. The joint compound of claim 13, wherein the mixture further comprises pregelatinized starch.

21. The joint compound of claim 20, wherein the pregelatinized starch is in an amount of from about 0.08 to about 0.5 percent by weight, based on the weight of the calcined gypsum.

22. The joint compound of claim 13, wherein the amount of enhancing material is from about 0.04 to about 0.16 percent by weight, based on the weight of the calcined gypsum.

23. The joint compound of claim 13, wherein the mixture comprises chloride ions or salts thereof.

* * * * *